US012055070B2

(12) United States Patent
Maeda et al.

(10) Patent No.: US 12,055,070 B2
(45) Date of Patent: Aug. 6, 2024

(54) STATIONARY BLADE SEGMENT, GAS TURBINE, AND METHOD FOR PRODUCING STATIONARY BLADE SEGMENT

(71) Applicant: MITSUBISHI HEAVY INDUSTRIES, LTD., Tokyo (JP)

(72) Inventors: Kengo Maeda, Tokyo (JP); Hiroyuki Otomo, Tokyo (JP); Yoshifumi Tsuji, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/562,134

(22) PCT Filed: May 11, 2022

(86) PCT No.: PCT/JP2022/019942

§ 371 (c)(1),
(2) Date: Nov. 17, 2023

(87) PCT Pub. No.: WO2022/255051

PCT Pub. Date: Dec. 8, 2022

(65) Prior Publication Data

US 2024/0229660 A1 Jul. 11, 2024

(30) Foreign Application Priority Data

May 31, 2021 (JP) ................................. 2021-091137

(51) Int. Cl.
*F01D 9/04* (2006.01)
*F01D 25/12* (2006.01)

(52) U.S. Cl.
CPC ............... *F01D 9/041* (2013.01); *F01D 9/04* (2013.01); *F01D 9/047* (2013.01); *F01D 25/12* (2013.01);

(Continued)

(58) Field of Classification Search
CPC . F01D 9/04; F01D 9/041; F01D 9/047; F05D 2240/10; F05D 2240/12; F05D 2240/128
See application file for complete search history.

(56) References Cited

U.S. PATENT DOCUMENTS 6,050,776 A 4/2000 Akagi et al.
6,592,326 B2 * 7/2003 Marx ...................... F01D 9/041 415/208.2

(Continued)

FOREIGN PATENT DOCUMENTS

JP 11-125102 5/1999
JP 2001-254605 9/2001

OTHER PUBLICATIONS

International Search Report issued Aug. 2, 2022 in corresponding International (PCT) Patent Application No. PCT/JP2022/019942, with English language translation.

(Continued)

*Primary Examiner* — Scott J Walthour
(74) *Attorney, Agent, or Firm* — WENDEROTH, LIND & PONACK, L.L.P.

(57) ABSTRACT

This stationary blade segment includes a first stationary blade, a second stationary blade, and a connecting implement that connects the first stationary blade and the second stationary blade. A first shroud of the first stationary blade includes a first gas path face, and a first protruding part that protrudes to a reverse-channel side at a first end section of the first shroud. A second shroud of the second stationary blade includes a second gas path face, a second protruding part that protrudes to the reverse-channel side at a first end section of the second shroud, and a third protruding part that protrudes to the reverse-channel side at a second end section of the second shroud and that is connected to the first protruding part by the connecting implement.

10 Claims, 10 Drawing Sheets

(52) U.S. Cl.
CPC ...... *F05D 2230/23* (2013.01); *F05D 2240/10* (2013.01); *F05D 2240/12* (2013.01); *F05D 2240/128* (2013.01); *F05D 2240/35* (2013.01); *F05D 2260/232* (2013.01)

(56) References Cited

U.S. PATENT DOCUMENTS

2001/0021343 A1 9/2001 Kuwabara et al.
2005/0254944 A1* 11/2005 Bash ........................ F01D 9/042
415/209.4

OTHER PUBLICATIONS

Written Opinion issued Aug. 2, 2022 in corresponding International (PCT) Patent Application No. PCT/JP2022/019942, with English language translation.

* cited by examiner

STATIONARY BLADE SEGMENT, GAS TURBINE, AND METHOD FOR PRODUCING STATIONARY BLADE SEGMENT

TECHNICAL FIELD

The present disclosure relates to a stator vane segment, a gas turbine, and a method for producing a stator vane segment.

Priority is claimed on Japanese Patent Application No. 2021-091137 filed on May 31, 2021, the content of which is incorporated herein by reference.

BACKGROUND ART

A stator vane segment that is obtained by integrating two stator vanes with each other is known, the two stator vanes being arranged in a circumferential direction in a gas turbine. For example, disclosed in PTL 1 and PTL 2 are stator vane segments, each of which is obtained by joining a flange provided at a suction-side end portion of a first stator vane (a pressure-side vane) and a flange provided at a pressure-side end portion of a second stator vane (a suction-side vane) to each other so that the first stator vane and the second stator vane which are arranged in a circumferential direction are integrated with each other.

CITATION LIST

Patent Literature

[PTL 1] Japanese Unexamined Patent Application Publication No. H11-125102

[PTL 2] Japanese Unexamined Patent Application Publication No. 2001-254605

SUMMARY OF INVENTION

Technical Problem

Incidentally, in the case of such a stator vane segment, a large thermal stress may act although depending on an environment in which the gas turbine is used or conditions under which the gas turbine is operated. In that case, the lifespan of the gas turbine may be shortened.

The present disclosure is made to solve the above-described problem, and an object of the present invention is to provide a stator vane segment, a gas turbine, and a method for producing a stator vane segment with which it is possible to reduce thermal stress.

Solution to Problem

In order to solve the above-described problem, an aspect of the present disclosure provides a stator vane segment including a first stator vane, a second stator vane aligned with the first stator vane, and a joining tool that joins the first stator vane and the second stator vane to each other. The second stator vane is positioned, with respect to the first stator vane, on a first side among the first side and a second side in a lateral direction in which the first stator vane and the second stator vane are arranged. Each of the first stator vane and the second stator vane includes a vane body that is disposed in a combustion gas flow path, and a shroud that is provided at an end of the vane body in a vane height direction. A first shroud, which is the shroud of the first stator vane, includes a first gas path surface that faces the combustion gas flow path, and a first protrusion portion that protrudes toward a counter-flow path side, which is a side opposite to the combustion gas flow path, and that is positioned at a first end portion of the first shroud which is an end portion on the first side. A second shroud, which is the shroud of the second stator vane, includes a second gas path surface that faces the combustion gas flow path, a second protrusion portion that protrudes toward the counter-flow path side and that is positioned at a first end portion of the second shroud which is an end portion on the first side, and a third protrusion portion that protrudes toward the counter-flow path side and that is positioned at a second end portion of the second shroud which is an end portion on the second side, the third protrusion portion being joined to the first protrusion portion by the joining tool. In a region aligned with the first protrusion portion in the lateral direction, a distance between a surface farthest from the first gas path surface among surfaces of a second end portion of the first shroud which is an end portion on the second side and the first gas path surface is smaller than a distance between a surface farthest from the second gas path surface among surfaces of the second protrusion portion and the second gas path surface.

In order to solve the above-described problem, an aspect of the present disclosure provides a gas turbine including a stator vane segment, a rotor that is rotatable around an axis, a casing that covers an outer peripheral side of the rotor, and a combustor that generates a combustion gas through combustion of fuel and that sends the combustion gas into the casing. The stator vane segment is provided on an inner peripheral side of the casing. The stator vane segment includes a first stator vane, a second stator vane aligned with the first stator vane, and a joining tool that joins the first stator vane and the second stator vane to each other. The second stator vane is positioned, with respect to the first stator vane, on a first side among the first side and a second side in a lateral direction in which the first stator vane and the second stator vane are arranged. Each of the first stator vane and the second stator vane includes a vane body that is disposed in a combustion gas flow path, and a shroud that is provided at an end of the vane body in a vane height direction. A first shroud, which is the shroud of the first stator vane, includes a first gas path surface that faces the combustion gas flow path, and a first protrusion portion that protrudes toward a counter-flow path side, which is a side opposite to the combustion gas flow path, and that is positioned at a first end portion of the first shroud which is an end portion on the first side. A second shroud, which is the shroud of the second stator vane, includes a second gas path surface that faces the combustion gas flow path, a second protrusion portion that protrudes toward the counter-flow path side and that is positioned at a first end portion of the second shroud which is an end portion on the first side, and a third protrusion portion that protrudes toward the counter-flow path side and that is positioned at a second end portion of the second shroud which is an end portion on the second side, the third protrusion portion being joined to the first protrusion portion by the joining tool. In a region aligned with the first protrusion portion in the lateral direction, a distance between a surface farthest from the first gas path surface among surfaces of a second end portion of the first shroud which is an end portion on the second side and the first gas path surface is smaller than a distance between a surface farthest from the second gas path surface among surfaces of the second protrusion portion and the second gas path surface.

In order to solve the above-described problem, an aspect of the present disclosure provides a method for producing a stator vane segment in which a first stator vane and a second stator vane are joined to each other by a joining tool and the second stator vane is positioned, with respect to the first stator vane, on a first side among the first side and a second side in a lateral direction in which the first stator vane and the second stator vane are arranged, the method including: preparing a first stator vane component and a second stator vane component each of which includes a vane body that is disposed in a combustion gas flow path and that has an airfoil shape and a shroud that is provided at an end of the vane body in a vane height direction, the shroud including a gas path surface that faces the combustion gas flow path, a protrusion portion that is positioned at a first end portion of the shroud which is an end portion on the first side and that protrudes toward a counter-flow path side which is a side opposite to the combustion gas flow path, and a protrusion portion that is positioned at a second end portion of the shroud which is an end portion on the second side and that protrudes toward the counter-flow path side; forming the first stator vane from the first stator vane component by removing at least a portion of the protrusion portion of the second end portion of the first stator vane component; forming the second stator vane from the second stator vane component without removal of the protrusion portion of the first end portion of the second stator vane component; and joining the protrusion portion of the first end portion of the first stator vane and the protrusion portion of the second end portion of the second stator vane to each other by means of the joining tool.

Advantageous Effects of Invention

According to a stator vane segment, a gas turbine, and a method for producing a stator vane segment of the present disclosure, it is possible to reduce thermal stress.

DESCRIPTION OF EMBODIMENTS

Figure 1:
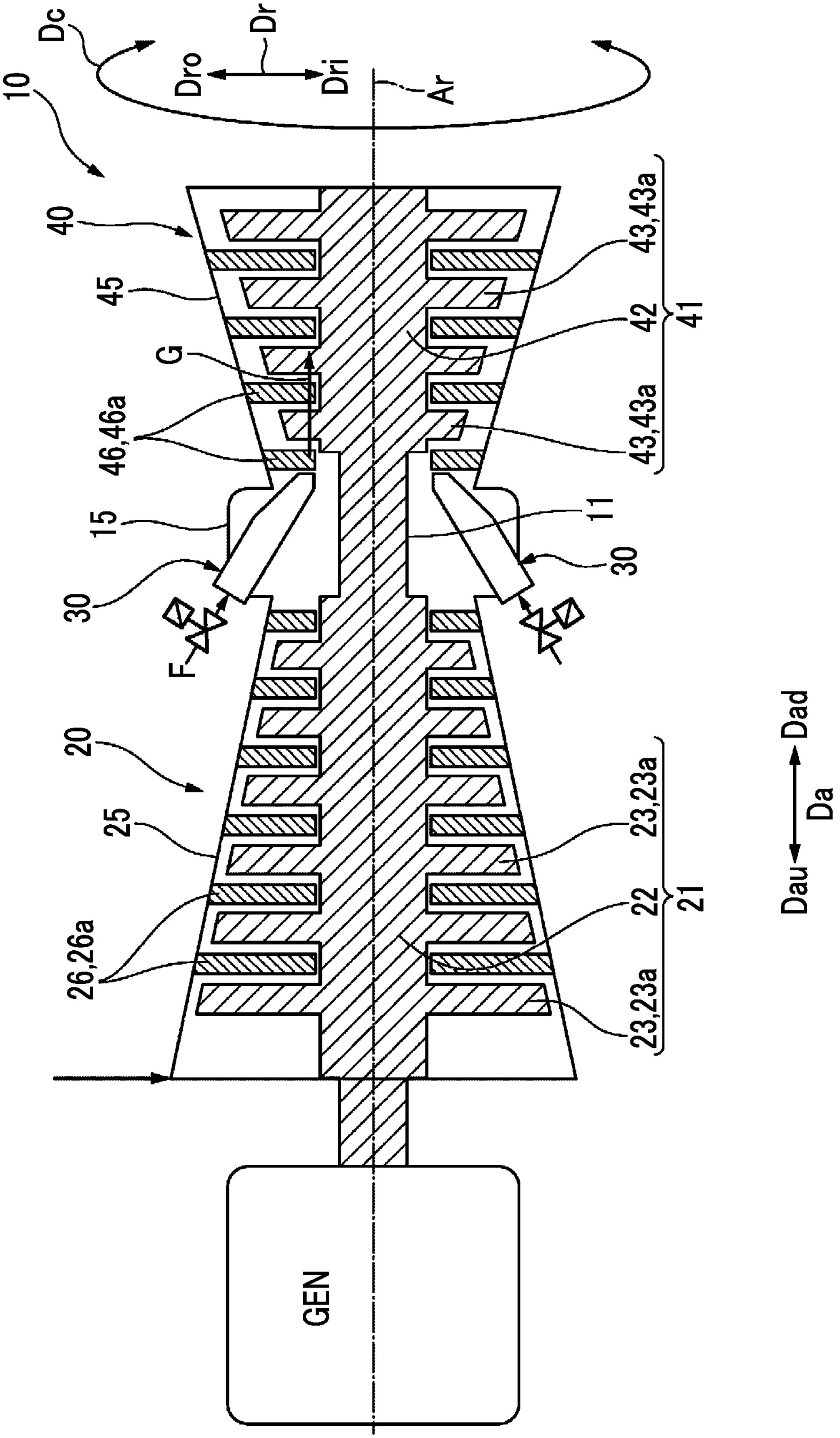
FIG. 1 is a cross-sectional view schematically showing the entire body of a gas turbine according to an embodiment of the present disclosure.

Hereinafter, a stator vane segment, a gas turbine, and a method for producing a stator vane segment according to an embodiment of the present disclosure will be described with reference to the drawings. In the following description, configurations having the same or similar functions are given the same reference numerals. In addition, repetitive descriptions of such configurations may be omitted.

Embodiment (Configuration of Gas Turbine)

FIG. 1 is a cross-sectional view schematically showing the entire body of a gas turbine 10 according to an embodiment. The gas turbine 10 includes a compressor 20 that compresses air A, a combustor 30 that combusts fuel F in the air A, which has been compressed by the compressor 20, to generate combustion gas G, and a turbine 40 that is driven by the combustion gas G.

The compressor 20 includes a compressor rotor 21 that rotates around an axis Ar, a compressor casing 25 that covers an outer peripheral side of the compressor rotor 21, and a plurality of stator vane stages 26. The turbine 40 includes a turbine rotor 41 that rotates around the axis Ar, a turbine casing 45 that covers an outer peripheral side of the turbine rotor 41, and a plurality of stator vane stages 46. The turbine casing 45 is an example of a “casing”.

The compressor rotor 21 and the turbine rotor 41 are positioned on the same axis Ar and are connected to each other to form a gas turbine rotor 11. For example, a rotor of a generator GEN is connected to the gas turbine rotor 11. The compressor casing 25 and the turbine casing 45 are connected to each other to form a gas turbine casing 15. In the following description, a direction in which the axis Ar extends will be referred to as an axial direction Da, a circumferential direction around the axis Ar will be referred to as a circumferential direction Dc, and a direction perpendicular to the axis Ar will be referred to as a radial direction Dr. A side close to the compressor 20 in the axial direction Da with respect to the turbine 40 will be referred to as an axial upstream side Dau, and a side opposite thereto will be referred to as an axial downstream side Dad. Hereinafter, the axial upstream side Dau in the axial direction Da may be referred to as a front side, and the axial downstream side Dad in the axial direction Da may be referred to as a rear side. In addition, the circumferential direction Dc may be referred to as a lateral direction Dc. In addition, a side close to the axis Ar in the radial direction Dr will be referred to as a radial inner side Dri and the opposite side will be referred to as a radial outer side Dro.

The compressor rotor 21 includes a rotor shaft 22 that is centered on the axis Ar and that extends in the axial direction Da and a plurality of rotor blade stages 23 attached to the rotor shaft 22. The plurality of rotor blade stages 23 are arranged in the axial direction Da. Each of the rotor blade stages 23 is composed of a plurality of rotor blades 23*a* arranged in the circumferential direction Dc. For each of the plurality of rotor blade stages 23, the stator vane stage 26 is disposed on the axial downstream side Dad. Each stator vane stage 26 is provided inside the compressor casing 25. Each of the stator vane stages 26 is composed of a plurality of stator vanes 26*a* arranged in the circumferential direction Dc.

The turbine rotor 41 includes a rotor shaft 42 that is centered on the axis Ar and that extends in the axial direction Da and a plurality of rotor blade stages 43 attached to the rotor shaft 42. The plurality of rotor blade stages 43 are arranged in the axial direction Da. Each of the rotor blade stages 43 is composed of a plurality of rotor blades 43*a* arranged in the circumferential direction Dc. For each of the plurality of rotor blade stages 43, the stator vane stage 46 is disposed on the axial upstream side Dau. Each stator vane stage 46 is provided inside the turbine casing 45. Each of the stator vane stages 46 is composed of a plurality of gas turbine stator vanes 46*a* arranged in the circumferential direction Dc. In the following description, the gas turbine stator vanes will be simply referred to as stator vanes.

Figure 2:
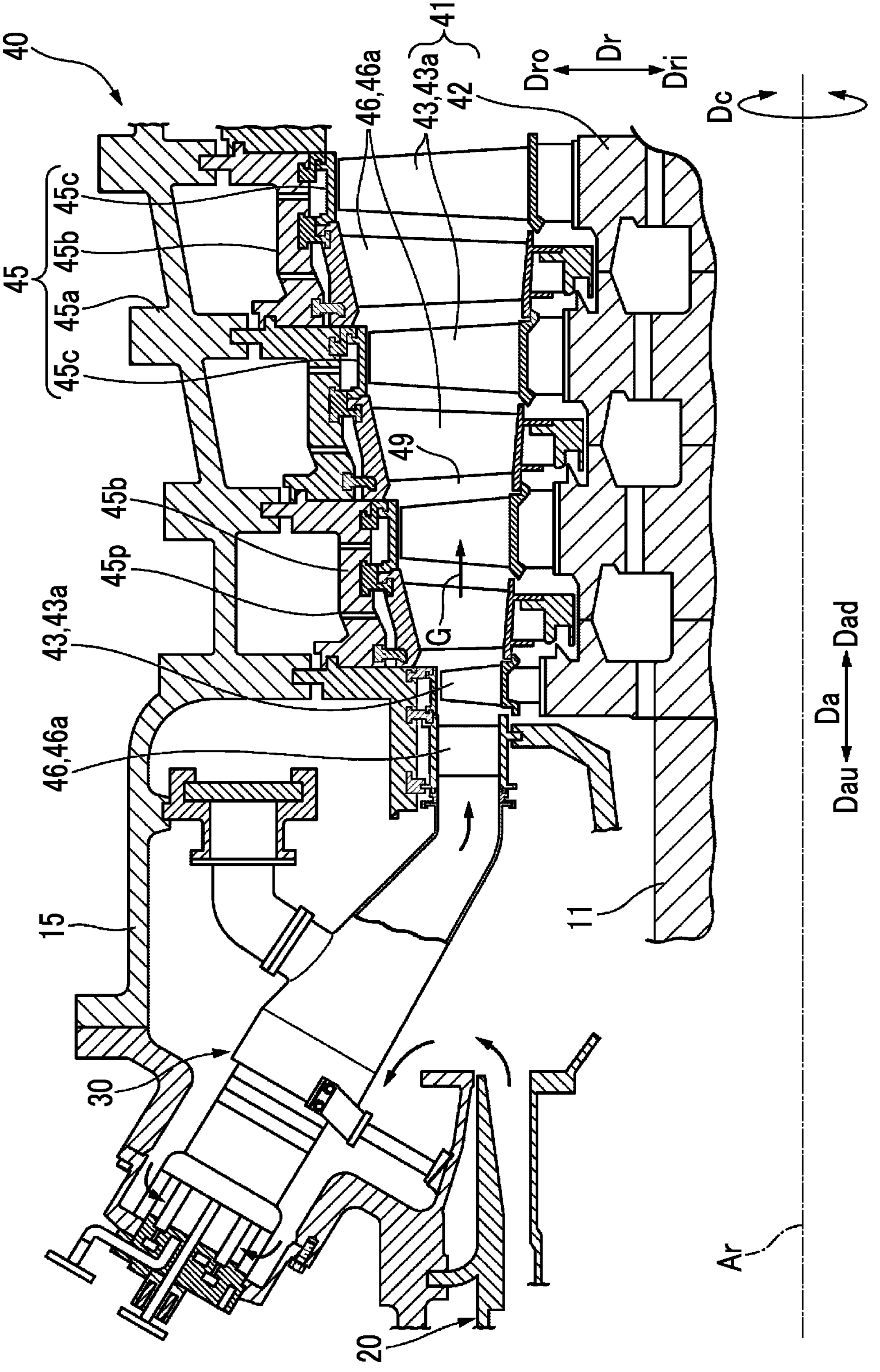
FIG. 2 is an enlarged cross-sectional view showing a portion of the gas turbine according to the embodiment of the present disclosure.

FIG. 2 is an enlarged cross-sectional view showing a portion of the gas turbine 10 according to the embodiment. The turbine casing 45 includes a tubular outer casing 45*a* constituting an outer shell of the turbine casing 45, an inner casing 45*b* fixed to an inner side of the outer casing 45*a*, and a plurality of ring segments 45*c* fixed to an inner side of the inner casing 45*b*. Each of the plurality of ring segments 45*c* is provided at a position between two of the plurality of stator vane stages 46 that are adjacent to each other. Therefore, for each of the ring segments 45*c*, the rotor blade stage 43 is disposed on the radial inner side Dri.

A space between the rotor shaft 42 and the turbine casing 45 in the radial direction Dr where the stator vanes 46*a* and the rotor blades 43*a* are disposed constitutes a combustion gas flow path 49 through which the combustion gas G from the combustor 30 flows. The combustion gas flow path 49 has an annular shape centered on the axis Ar and is long in the axial direction Da. Cooling air paths 45*p* that penetrate the inner casing 45*b* in a direction from the radial outer side Dro to the radial inner side Dri are formed in the inner casing 45*b* of the turbine casing 45. Cooling air passing through the cooling air paths 45*p* is introduced into the stator vanes 46*a* and the ring segments 45*c* and is used to cool the stator vanes 46*a* and the ring segments 45*c*. Note that, although a case where air in the gas turbine casing 15 is supplied, as cooling air, to the stator vane stages 46 via the cooling air paths 45*p* has been described above, a path for supply of cooling air to the stator vanes 46*a* is not limited to the above-described path.

(Operation of Gas Turbine)

Referring to FIG. 1 again, the operation of the gas turbine 10 will be described. The compressor 20 compresses the air A to generate compressed air. The compressed air generated by the compressor 20 flows into the combustor 30. The fuel F is supplied to the combustor 30. In the combustor 30, the fuel F is combusted in the compressed air so that the combustion gas G of which the temperature and the pressure are high is generated. The combustion gas G generated by the combustor 30 is sent from the combustor 30 to the combustion gas flow path 49 inside the turbine 40. The combustion gas G rotates the turbine rotor 41 while flowing through the combustion gas flow path 49 toward the axial downstream side Dad. The rotor of the generator GEN connected to the gas turbine rotor 11 is rotated as the turbine rotor 41 rotates. As a result, the generator GEN generates electricity.

(Configuration of Stator Vane Segment)

Figure 3:
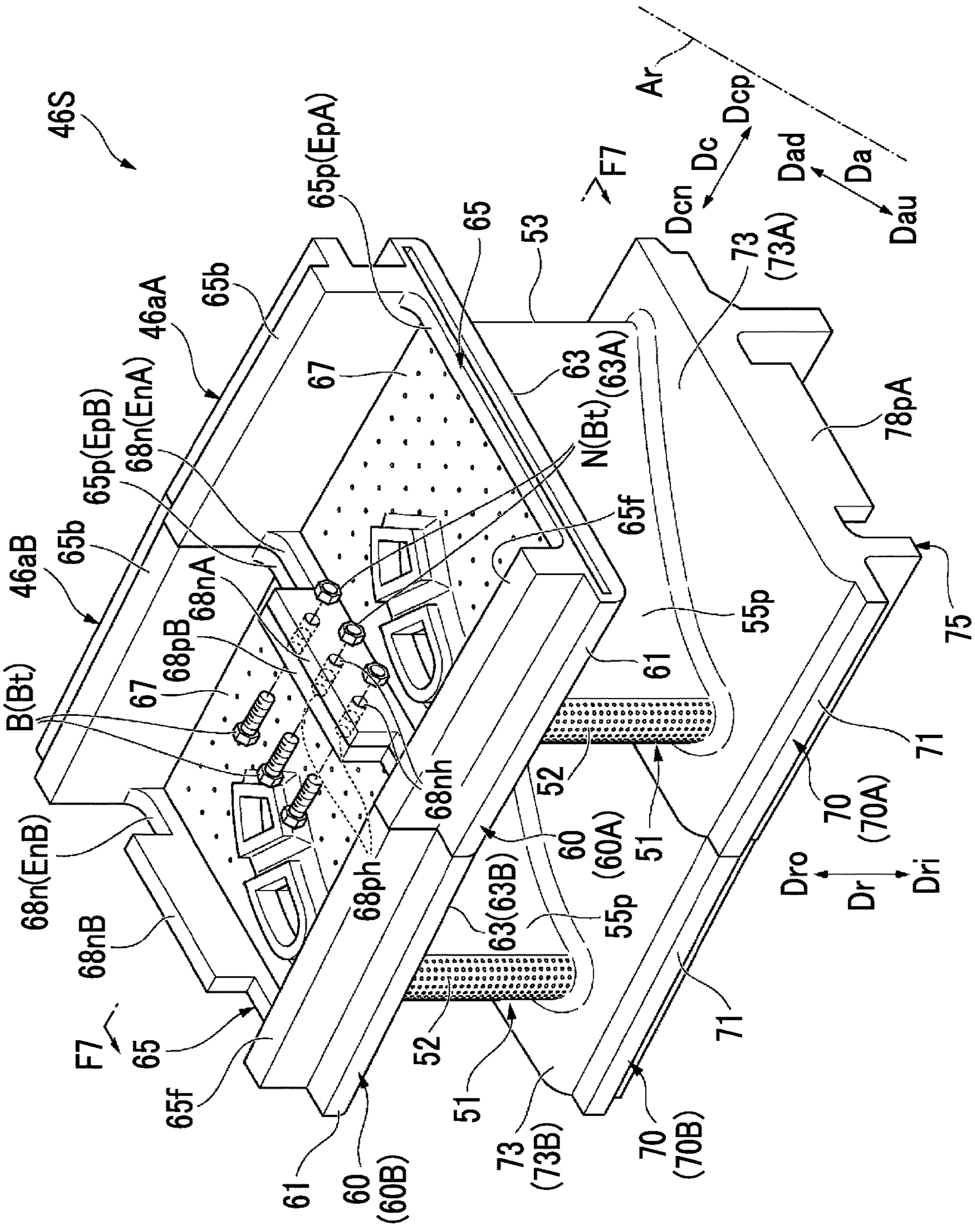
FIG. 3 is a perspective view showing a stator vane segment according to the embodiment of the present disclosure.

FIG. 3 is a perspective view showing a stator vane segment 46S of the embodiment. The stator vane stage 46 of the turbine 40 of the present embodiment includes a plurality of stator vane segments 46S (only one stator vane segment 46S is shown in FIG. 3) arranged in the lateral direction Dc. Although the stator vane segment 46S described hereinafter can be applied to the second stator vane stage 46 counting from the axial upstream side Dau, for example. However, the stator vane segment 46S may also be applied to another stator vane stage 46. The stator vane segment 46S includes at least a first stator vane 46*a*A, a second stator vane 46*a*B, and joining tools Bt that join the first stator vane 46*a*A and the second stator vane 46*a*B to each other, the first stator vane 46*a*A and the second stator vane 46*a*B being two stator vanes 46*a* arranged in the circumferential direction Dc. The stator vane segment 46S is an assembly obtained by joining the two stator vanes 46*a*, which are adjacent to each other in the circumferential direction Dc, to each other by means of the joining tools Bt. The stator vane segment 46S may be referred to as a "stator vane assembly".

In the present embodiment, the second stator vane 46*a*B is positioned, with respect to the first stator vane 46*a*A, on a suction side among the suction side and a pressure side in the circumferential direction Dc in which the first stator vane 46*a*A and the second stator vane 46*a*B are arranged. That is, the second stator vane 46*a*B is positioned, with respect to the first stator vane 46*a*A, close to a suction-side of a vane body 51. The "suction-side" means a side on which the vane body 51 has a convex shape. On the other hand, a "pressure-side" means the opposite side of the "suction-side" and means a side on which the vane body 51 has a concave shape.

In the present embodiment, the first stator vane 46*a*A and the second stator vane 46*a*B have the same shape as each other except for a configuration relating to a flange which will be described later. Therefore, hereinafter, the configuration of the first stator vane 46*a*A will be described in detail as a representative example. For the description regarding the second stator vane 46*a*B, replace the "first stator vane 46*a*A" with the "second stator vane 46*a*B" in the following description regarding the first stator vane 46*a*A.

Figure 4:
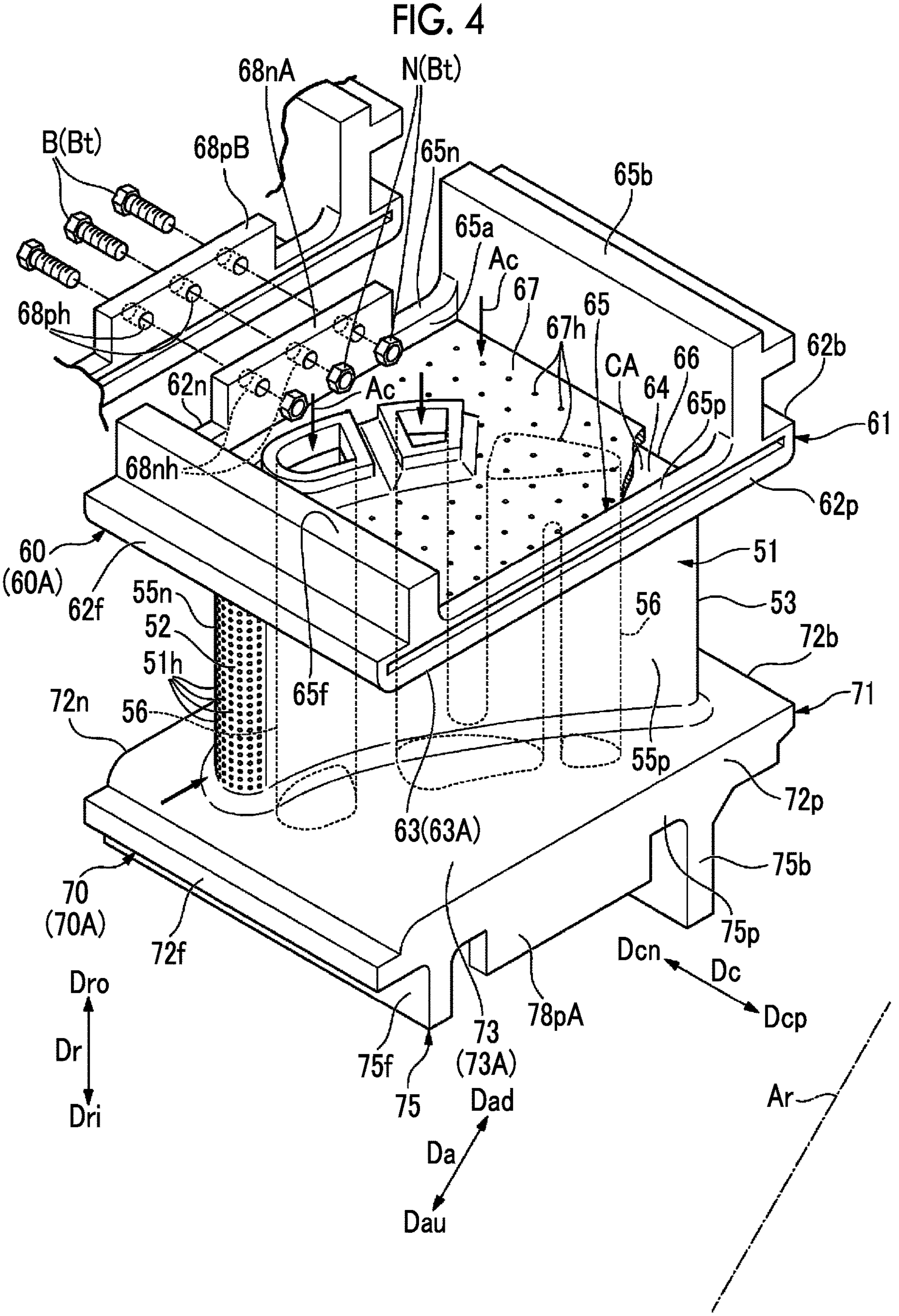
FIG. 4 is an enlarged perspective view showing a first stator vane according to the embodiment of the present disclosure.

FIG. 4 is an enlarged perspective view of the first stator vane 46*a*A. The first stator vane 46*a*A includes at least the vane body 51, an outer shroud 60, and an inner shroud 70. The vane body 51 has an airfoil shape and extends in the radial direction Dr. That is, a vane height direction of the vane body 51 is the radial direction Dr. The vane body 51 is disposed inside the combustion gas flow path 49 (refer to FIG. 2) through which the combustion gas G passes. The outer shroud 60 is provided at an end of the vane body 51 that is on the radial outer side Dro. That is, the outer shroud 60 is positioned on an outer peripheral side (the radial outer side Dro) of the stator vane segment 46S in the vane height direction of the vane body 51 and defines the outer peripheral position of the combustion gas flow path 49 having an annular shape. Meanwhile, the inner shroud 70 is provided at an end of the vane body 51 that is on the radial inner side Dri. That is, the inner shroud 70 is positioned on an inner peripheral side (the radial inner side Dri) of the stator vane segment 46S in the vane height direction of the vane body 51 and defines the inner peripheral position of the combustion gas flow path 49 having the annular shape.

(Configuration of Vane Body)

An end portion of the vane body 51 that is on the axial upstream side Dau forms a leading edge portion 52. Meanwhile, an end portion of the vane body 51 that is on the axial downstream side Dad forms a trailing edge portion 53. A convex surface of surfaces facing the circumferential direction Dc in a surface of the vane body 51 forms a suction-side surface 55*n* (=a suction surface), and a concave surface of the surfaces facing the circumferential direction Dc in a surface of the vane body 51 forms a pressure-side surface 55*p* (=a pressure surface). In the following description, a side in the circumferential direction Dc on which the suction-side surface 55*n* is present with respect to the pressure-side surface 55*p* will be referred to as a circumferential suction-side Don and a side in the circumferential direction Dc on which the pressure-side surface 55*p* is present with respect to the suction-side surface 55*n* will be referred to as a circumferential pressure-side Dcp.

In the vane body 51, a plurality of vane air paths 56 extending in the radial direction Dr are formed. Each of the vane air paths 56 is formed to continue from the outer shroud 60 to the inner shroud 70 through the inside of the vane body 51. The vane air paths 56 adjacent to each other, which are a portion of the plurality of vane air paths 56, partially communicate with each other on the radial outer side Dro or the radial inner side Dri. Any of the plurality of vane air paths 56 is open at the bottom of a recessed portion 66 (which will be described later) of the outer shroud 60. Any of the plurality of vane air paths 56 is open at the bottom of a recessed portion 76 (which will be described later) of the inner shroud 70. The vane air paths 56 communicate with a plurality of openings 51*h* provided in the leading edge portion 52 or the trailing edge portion 53 of the vane body 51. A portion of the cooling air flowing through the vane air paths 56 flows into the combustion gas flow path 49 through the plurality of openings 51*h* after cooling the vane body 51.

(Configuration of Outer Shroud)

The outer shroud 60 includes an outer shroud main body 61, an outer peripheral wall 65, a collision plate 67, and a suction-side flange 68*n*A. The suction-side flange 68*n*A will be described later.

The outer shroud main body 61 is formed in a plate-like shape extending in the axial direction Da and the circumferential direction Dc. The outer shroud main body 61 includes a front end surface 62*f*, a rear end surface 62*b*, a suction-side end surface 62*n*, a pressure-side end surface 62*p*, a gas path surface 63, and an outer internal surface 64. The front end surface 62*f* is an end surface that faces the axial upstream side Dau. The rear end surface 62*b* is an end surface that has a back-to-back relationship with the front end surface 62*f* and that faces the axial downstream side Dad. The suction-side end surface 62*n* is an end surface that connects the front end surface 62*f* and the rear end surface 62*b* to each other on a side close to the suction-side surface 55*n* of the vane body 51 and that faces the circumferential suction-side Dcn. The pressure-side end surface 62*p* is an end surface that connects the front end surface 62*f* and the rear end surface 62*b* to each other on a side close to the pressure-side surface 55*p* of the vane body 51 and that faces the circumferential pressure-side Dcp. In the present embodiment, the front end surface 62*f* and the rear end surface 62*b* are approximately parallel to each other and the suction-side end surface 62*n* and the pressure-side end surface 62*p* are approximately parallel to each other. Accordingly, the shape of the outer shroud main body 61 as seen in the radial direction Dr is a parallel quadrilateral shape. The gas path surface 63 is a surface that comes into contact with the combustion gas G (a surface that faces the combustion gas flow path 49) and faces the radial inner side Dri. The outer internal surface 64 is a surface facing a side opposite to the gas path surface 63.

The outer peripheral wall 65 protrudes toward the radial outer side Dro (that is, a counter-flow path side which is a side opposite to the combustion gas flow path 49 side) from the outer shroud main body 61 along an outer peripheral edge of the outer shroud main body 61. In the present embodiment, the outer peripheral wall 65 is formed over the entire circumference of the outer peripheral edge of the outer shroud main body 61. The outer peripheral wall 65 includes a front wall 65*f*, a rear wall 65*b*, a suction-side wall 65*n*, and a pressure-side wall 65*p*. The front wall 65*f* extends in the circumferential direction Dc along the front end surface 62*f* of the outer shroud main body 61 and faces the axial upstream side Dau. The rear wall 65*b* extends in the circumferential direction Dc along the rear end surface 62*b* of the outer shroud main body 61 and faces the axial downstream side Dad. The suction-side wall 65*n* extends along the suction-side end surface 62*n* of the outer shroud main body 61 and faces the circumferential suction-side Dcn. The suction-side wall 65*n* connects the front wall 65*f* and the rear wall 65*b* to each other on a side close to the suction-side surface 55*n* of the vane body 51. The pressure-side wall 65*p* extends along the pressure-side end surface 62*p* of the outer shroud main body 61 and faces the circumferential pressure-side Dcp. The pressure-side wall 65*p* connects the front wall 65*f* and the rear wall 65*b* to each other on a side close to the pressure-side surface 55*p* of the vane body 51. Both the front wall 65*f* and the rear wall 65*b* protrude toward the radial outer side Dro to a larger degree than the suction-side wall 65*n* and the pressure-side wall 65*p* and form hook portions. With the front wall 65*f* and the rear wall 65*b* forming the hook portions, the stator vane 46*a* is attached to an inner peripheral side of the turbine casing 45 (refer to FIG. 2).

The outer peripheral wall 65 enhances the rigidity of the outer shroud main body 61. Accordingly, the outer shroud main body 61 can be formed into a thinner plate. In addition, at the outer shroud 60 in the present embodiment, the recessed portion 66 recessed toward the radial inner side Dri is formed by the outer shroud main body 61 and the outer peripheral wall 65. The recessed portion 66 is provided with the collision plate 67.

The collision plate 67 partitions the recessed portion 66 of the outer shroud 60 into a region on the radial outer side Dro and a cavity CA, which is a region on the radial inner side Dri. The cavity CA is formed within a region surrounded by the outer internal surface 64, which is a surface of the outer shroud main body 61 that faces the radial outer side Dro, a face of the collision plate 67 that faces the radial inner side Dri, and inner wall surfaces 65*a* of the outer peripheral wall 65 (the front wall 65*f*, the rear wall 65*b*, the suction-side wall 65*n*, and the pressure-side wall 65*p*). A plurality of air holes 67*h* penetrating the collision plate 67 in the radial direction Dr are formed in the collision plate 67. A portion of cooling air Ac present on the radial outer side Dro of the stator vane 46*a* flows into the cavity CA through the air holes 67*h* of the collision plate 67. A portion of air flowing into the cavity CA is discharged to the combustion gas flow path 49 through cooling paths, which will be described later, after the outer shroud 60 is cooled.

(Configuration of Inner Shroud)

The inner shroud 70 includes an inner shroud main body 71, an inner peripheral wall 75, a suction-side flange 78*n*A (refer to FIG. 6), and a pressure-side flange 78*p*A. The suction-side flange 78*n*A and the pressure-side flange 78*p*A will be described later.

The inner shroud main body 71 is formed in a plate-like shape extending in the axial direction Da and the circumferential direction Dc. The inner shroud main body 71 includes a front end surface 72*f*, a rear end surface 72*b*, a suction-side end surface 72*n*, a pressure-side end surface 72*p*, a gas path surface 73, and an inner internal surface 74 (refer to FIG. 6). The front end surface 72*f*, the rear end surface 72*b*, the suction-side end surface 72*n*, and the pressure-side end surface 72*p* of the inner shroud main body 71 are the same as the front end surface 62*f*, the rear end surface 62*b*, the suction-side end surface 62*n*, and the pressure-side end surface 62*p* of the outer shroud main body 61, respectively. Therefore, detailed description thereof will be omitted. The gas path surface 73 is a surface that comes into contact with the combustion gas G (a surface that faces the combustion gas pass 49) and faces the radial outer side Dro. The inner internal surface 74 is a surface facing a side opposite to the gas path surface 73.

The inner peripheral wall 75 protrudes toward the radial inner side Dri (that is, a counter-flow path side which is a side opposite to the combustion gas flow path 49 side) from the inner shroud main body 71 along an outer peripheral edge of the inner shroud main body 71. In the present embodiment, the inner peripheral wall 75 is formed over the entire circumference of the outer peripheral edge of the inner shroud main body 71. The inner peripheral wall 75 includes a front wall 75*f*, a rear wall 75*b*, a suction-side wall 75*n* (refer to FIG. 6), and a pressure-side wall 75*p*. The front wall 75*f* extends in the circumferential direction Dc along the front end surface 72*f* of the inner shroud main body 71 and faces the axial upstream side Dau. The rear wall 75*b* extends in the circumferential direction Dc along the rear end surface 72*b* of the inner shroud main body 71 and faces the axial downstream side Dad. The suction-side wall 75*n* extends along the suction-side end surface 72*n* of the inner shroud main body 71 and faces the circumferential suction-side Dcn. The suction-side wall 75*n* connects the front wall 75*f* and the rear wall 75*b* to each other on a side close to the suction-side surface 55*n* of the vane body 51. The pressure-side wall 75*p* extends along the pressure-side end surface 72*p* of the inner shroud main body 71 and faces the circumferential pressure-side Dcp. The pressure-side wall 75*p* connects the front wall 75*f* and the rear wall 75*b* to each other on a side close to the pressure-side surface 55*p* of the vane body 51. At the inner shroud 70, the recessed portion 76 recessed toward the radial outer side Dro is formed by the inner shroud main body 71 and the inner peripheral wall 75 (refer to FIG. 6). The inner peripheral wall 75 enhances the rigidity of the inner shroud main body 71. Accordingly, the inner shroud main body 71 can be formed into a thinner plate.

Hereinabove, the outer shroud 60 and the inner shroud 70 of the first stator vane 46*a*A has been described. The outer shroud 60 of the first stator vane 46*a*A is an example of a "first shroud". The outer shroud main body 61 of the first stator vane 46*a*A is an example of a "first shroud main body". The gas path surface 63 of the first stator vane 46*a*A is an example of a "first gas path surface". The outer peripheral wall 65 of the first stator vane 46*a*A is an example of a "first peripheral wall". Hereinafter, for the sake of convenience of description, the outer shroud 60 of the first stator vane 46*a*A will be referred to as an "outer shroud 60A", and the inner shroud 70 of the first stator vane 46*a*A will be referred to as an "inner shroud 70A". In addition, the gas path surface 63 of the first stator vane 46*a*A will be referred to as a "gas path surface 63A", and the gas path surface 73 of the first stator vane 46*a*A will be referred to as a "gas path surface 73A".

As described above, the second stator vane 46*a*B has the same shape as the first stator vane 46*a*A except for a configuration relating to a flange. That is, as with the first stator vane 46*a*A, the second stator vane 46*a*B includes the vane body 51, the outer shroud 60, and the inner shroud 70. The outer shroud 60 of the second stator vane 46*a*B is an example of a "second shroud". The outer shroud main body 61 of the second stator vane 46*a*B is an example of a "second shroud main body". The gas path surface 63 of the second stator vane 46*a*B is an example of a "second gas path surface". The outer peripheral wall 65 of the second stator vane 46*a*B is an example of a "second peripheral wall". Hereinafter, for the sake of convenience of description, the outer shroud 60 of the second stator vane 46*a*B will be referred to as an "outer shroud 60B", and the inner shroud 70 of the second stator vane 46*a*B will be referred to as an "inner shroud 70B". In addition, the gas path surface 63 of the second stator vane 46*a*B will be referred to as a "gas path surface 63B", and the gas path surface 73 of the second stator vane 46*a*B will be referred to as a "gas path surface 73B".

(Configuration of Flange)

Next, referring again to FIG. 3, a configuration relating to flanges will be described.

First, the outer shroud 60A of the first stator vane 46*a*A will be described. In the present embodiment, the outer shroud 60A includes the suction-side flange 68*n*A. The meaning of a "flange" in the present specification is, for example, a protrusion portion protruding in a plate-like shape.

The suction-side flange 68*n*A is positioned on a suction-side end portion EnA of the outer shroud 60A and protrudes toward the radial outer side Dro. The "suction-side end portion EnA" is an end portion (an end portion that faces the second stator vane 46*a*B) of the outer shroud 60A that is positioned on the circumferential suction-side Dcn (that is, a suction side). In the present embodiment, the suction-side flange 68*n*A is provided on the suction-side wall 65*n* of the outer peripheral wall 65 and protrudes toward the radial outer side Dro from the suction-side wall 65*n*. The suction-side flange 68*n*A is provided on a portion of the suction-side wall 65*n* in the axial direction Da. For example, the suction-side flange 68*n*A is disposed on an intermediate portion of the suction-side wall 65*n* in the axial direction Da. The suction-side flange 68*n*A is provided with one or more (for example, a plurality of) insertion holes 68*nh* through which the joining tools Bt are inserted. The insertion holes 68*nh* are examples of "a hole through which a joining tool is inserted". The suction-side flange 68*n*A is an example of a "first suction-side protrusion portion".

In the present embodiment, a pressure-side end portion EpA of the outer shroud 60A is provided with no flange. The "pressure-side end portion EpA" is an end portion (an end portion that faces a side opposite to the second stator vane 46*a*B) of the outer shroud 60A that is positioned on the circumferential pressure-side Dcp (that is, a pressure side).

Next, the outer shroud 60B of the second stator vane 46*a*B will be described. In the present embodiment, the outer shroud 60B includes a suction-side flange 68*n*B and a pressure-side flange 68*p*B.

The suction-side flange 68*n*B is positioned on a suction-side end portion EnB of the outer shroud 60B and protrudes toward the radial outer side Dro. The "suction-side end portion EnB" is an end portion (an end portion that faces a side opposite to the first stator vane 46*a*A) of the outer shroud 60B that is positioned on the circumferential suction-side Dcn (that is, the suction side). In the present embodiment, the suction-side flange 68*n*B has the same outer shape as the suction-side flange 68*n*A of the first stator vane 46*a*A. Here, cases where "the flanges have the same outer shape as each other" may include a case where the flanges are different from each other in whether or not insertion holes through which the joining tools Bt are inserted are provided.

The above-described definition also applies to the following description. In the present embodiment, the suction-side flange 68*n*B is provided on the suction-side wall 65*n* of the outer peripheral wall 65 and protrudes toward the radial outer side Dro from the suction-side wall 65*n*. The suction-side flange 68*n*B is provided on a portion of the suction-side wall 65*n* in the axial direction Da. For example, the suction-side flange 68*n*B is disposed on an intermediate portion of the suction-side wall 65*n* in the axial direction Da. The suction-side flange 68*n*B is provided with no insertion hole through which the joining tool Bt is inserted. The suction-side flange 68*n*B is an example of a "second suction-side protrusion portion".

Meanwhile, the pressure-side flange 68*p*B is positioned on a pressure-side end portion EpB of the outer shroud 60B and protrudes toward the radial outer side Dro. The "pressure-side end portion EpB" is an end portion (an end portion that faces the first stator vane 46*a*A) of the outer shroud 60B that is positioned on the circumferential pressure-side Dcp (that is, the pressure side). In the present embodiment, the pressure-side flange 68*p*B is provided on the pressure-side wall 65*p* of the outer peripheral wall 65 and protrudes toward the radial outer side Dro from the pressure-side wall 65*p*. In the present embodiment, the pressure-side flange 68*p*B has the same outer shape as the suction-side flange 68*n*A of the first stator vane 46*a*A. The pressure-side flange 68*p*B is provided on a portion of the pressure-side wall 65*p* in the axial direction Da. For example, the pressure-side flange 68*p*B is disposed on an intermediate portion of the pressure-side wall 65*p* in the axial direction Da. The pressure-side flange 68*p*B and the suction-side flange 68*n*A of the first stator vane 46*a*A face each other in the lateral direction Dc. The pressure-side flange 68*p*B is provided with one or more (for example, a plurality of) insertion holes 68*ph* through which the joining tools Bt (which will be described later) are inserted. The pressure-side flange 68*p*B is an example of a "pressure-side protrusion portion".

The joining tools Bt join the first stator vane 46*a*A and the second stator vane 46*a*B to each other, the first stator vane 46*a*A and the second stator vane 46*a*B constituting one stator vane segment 46S. The joining tools Bt described in the present embodiment are composed of bolts B and nuts N. The joining tools Bt are inserted through the insertion holes 68*nh* of the suction-side flange 68*n*A of the first stator vane 46*a*A and the insertion holes 68*ph* of the pressure-side flange 68*p*B of the second stator vane 46*a*B so that the suction-side flange 68*n*A of the first stator vane 46*a*A and the pressure-side flange 68*p*B of the second stator vane 46*a*B are joined to each other. Meanwhile, the plurality of stator vane segments 46S that are adjacent to each other in the circumferential direction Dc are not joined to each other by the joining tools Bt.

The configuration relating to the flanges described above can be described as follows.

Figure 5:
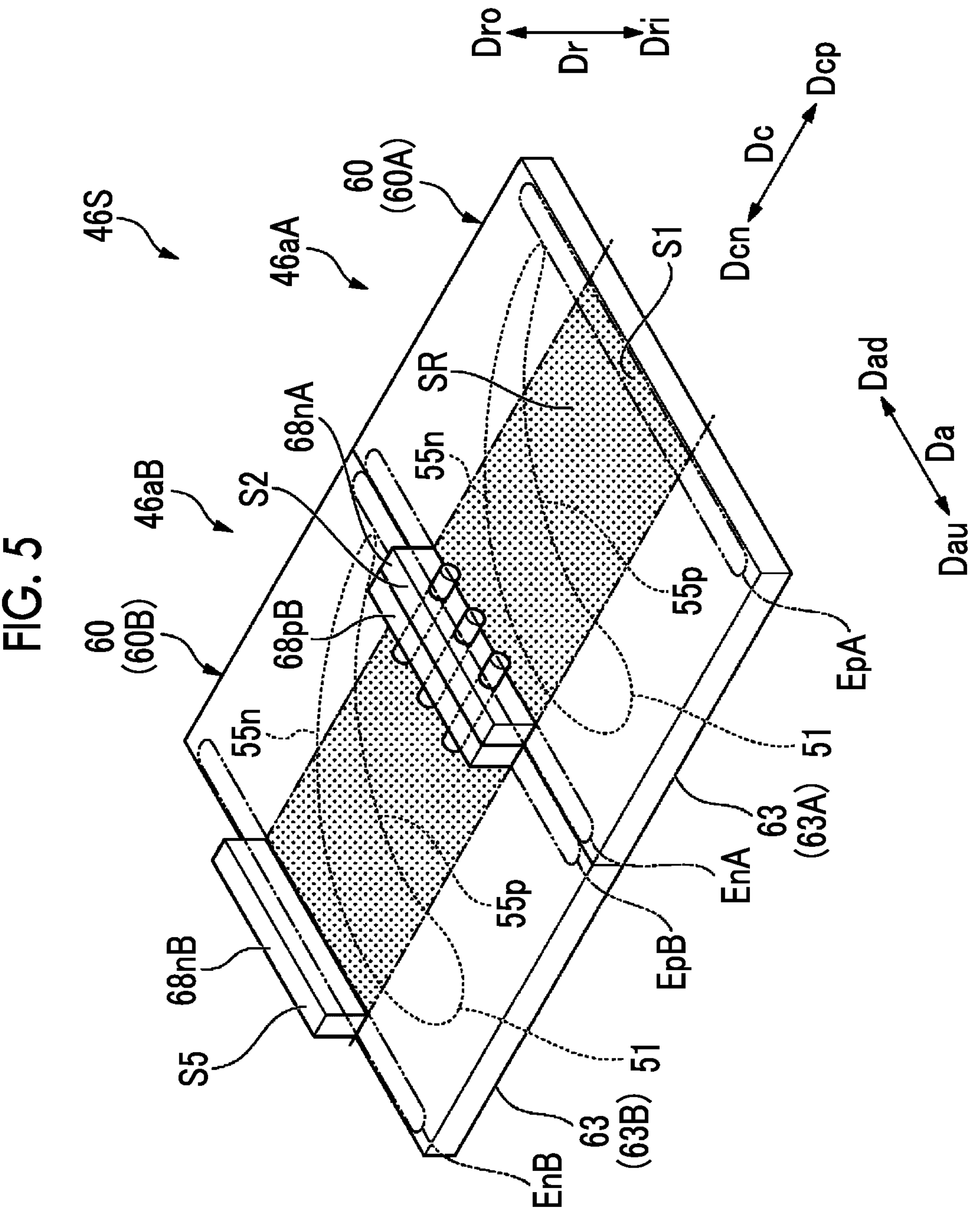
FIG. 5 is a perspective view schematically showing a portion of the stator vane segment according to the embodiment of the present disclosure.
Figure 6:
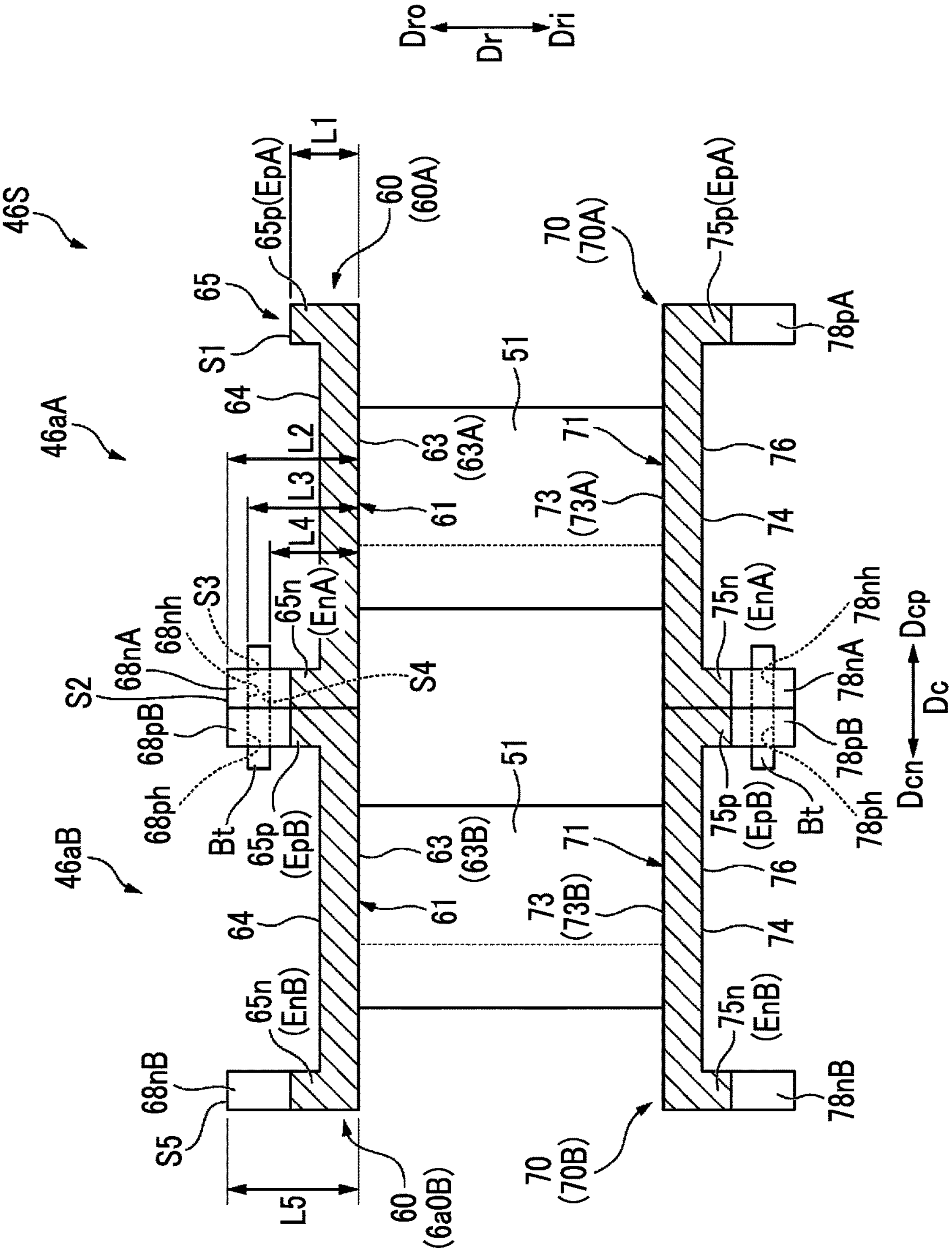
FIG. 6 is a cross-sectional view schematically showing the stator vane segment according to the embodiment of the present disclosure.

FIG. 5 is a perspective view schematically showing the outer shroud 60A of the first stator vane 46*a*A and the outer shroud 60B of the second stator vane 46*a*B, which are a portion of the stator vane segment 46S of the embodiment. FIG. 6 is a cross-sectional view schematically showing the stator vane segment 46S of the embodiment.

In the present embodiment, the outer shroud 60A of the stator vane segment 46S includes a region SR (refer to FIG. 5 (hereinafter, will be referred to as a "specific region SR")) that is aligned with the suction-side flange 68*n*A of the first stator vane 46*a*A in the lateral direction Dc. In FIG. 5, for the sake of convenience of description, the specific region SR is hatched with dots. In the specific region SR, a surface S1, which is a surface farthest from the gas path surface 63A among surfaces of the pressure-side end portion EpA of the outer shroud 60A of the first stator vane 46*a*A, is close to the gas path surface 63A in comparison with a surface S2, which is a surface farthest from the gas path surface 63A among surfaces of the suction-side flange 68*n*A of the first stator vane 46*a*A. In other words, as shown in FIG. 6, a distance L1 between the surface S1 and the gas path surface 63A is smaller than a distance L2 between the surface S2 and the gas path surface 63A. In the present embodiment, the surface S1 is a portion of an upper surface (a surface that faces the radial outer side Dro) of the pressure-side wall 65*p*.

In the present embodiment, the surface S1 is close to the gas path surface 63A in comparison with a surface S3, which is a surface farthest from the gas path surface 63A among inner peripheral surfaces of the insertion hole 68*nh* provided in the suction-side flange 68*n*A. That is, the distance L1 between the surface S1 and the gas path surface 63A is smaller than a distance L3 between the surface S3 and the gas path surface 63A. Furthermore, the surface S1 is close to the gas path surface 63A in comparison with a surface S4, which is a surface closest to the gas path surface 63A among the inner peripheral surfaces of the insertion hole 68*nh* provided in the suction-side flange 68*n*A. That is, the distance L1 between the surface S1 and the gas path surface 63A is smaller than a distance L4 between the surface S4 and the gas path surface 63A.

As seen from another viewpoint, the suction-side flange 68*n*B of the second stator vane 46*a*B includes a surface S5, which is a surface farthest from the gas path surface 63B among surfaces of the suction-side flange 68*n*B. In addition, the distance L1 between the surface S1 and the gas path surface 63A is smaller than a distance L5 between the surface S5 and the gas path surface 63B.

Next, flanges relating to the two inner shrouds 70A and 70B will be described.

In the present embodiment, the inner shroud 70A includes the suction-side flange 78*n*A and the pressure-side flange 78*p*A. The suction-side flange 78*n*A and the pressure-side flange 78*p*A are respectively provided at the suction-side end portion EnA and the pressure-side end portion EpA of the inner shroud 70A and protrude toward the radial inner side Dri. In the present embodiment, the suction-side flange 78*n*A is provided on the suction-side wall 75*n* of the inner peripheral wall 75 and protrudes toward the radial inner side Dri from the suction-side wall 75*n*. The pressure-side flange 78*p*A is provided on the pressure-side wall 75*p* of the inner peripheral wall 75 and protrudes toward the radial inner side Dri from the pressure-side wall 75*p*. The suction-side flange 78*n*A and the pressure-side flange 78*p*A have the same outer shape as the suction-side flange 68*n*A of the first stator vane 46*a*A, for example. The suction-side flange 78*n*A is provided with one or more (for example, a plurality of) insertion holes 78*nh* through which the joining tools Bt are inserted. Meanwhile, the pressure-side flange 78*p*A is provided with no insertion hole.

In the present embodiment, the inner shroud 70B includes a suction-side flange 78*n*B and a pressure-side flange 78*p*B. The suction-side flange 78*n*B and the pressure-side flange 78*p*B are respectively provided at the suction-side end portion EnB and the pressure-side end portion EpB of the inner shroud 70B and protrude toward the radial inner side Dri. In the present embodiment, the suction-side flange 78*n*B is provided on the suction-side wall 75*n* of the inner peripheral wall 75 and protrudes toward the radial inner side Dri from the suction-side wall 75*n*. The pressure-side flange 78*p*B is provided on the pressure-side wall 75*p* of the inner peripheral wall 75 and protrudes toward the radial inner side Dri from the pressure-side wall 75*p*. The suction-side flange 78*n*B and the pressure-side flange 78*p*B have the same outer shape as the suction-side flange 78*n*A and the pressure-side flange 78*p*A. The pressure-side flange 78*p*B is provided with one or more (for example, a plurality of) insertion holes 78*ph* through which the joining tools Bt are inserted. The pressure-side flange 78*p*B is joined to the suction-side flange 78*n*A by the joining tools Bt. Meanwhile, the suction-side flange 78*n*B is provided with no insertion hole.

(Configuration of Cooling Path)

Next, the configurations of cooling paths provided in the outer shrouds 60A and 60B will be described.

Figure 7:
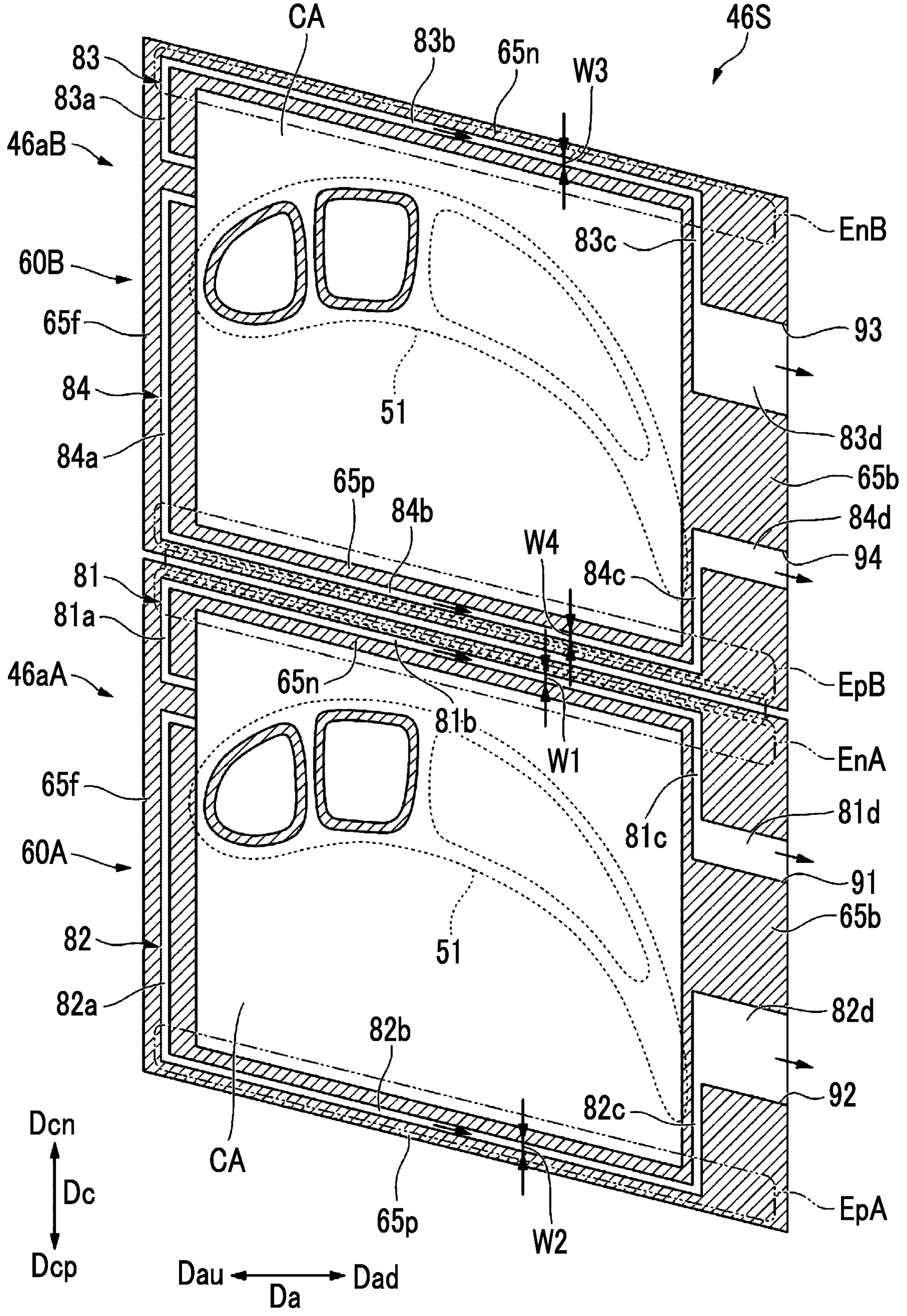
FIG. 7 is a cross-sectional view showing outer shrouds shown in FIG. 3, which is taken along line F7-F7.

FIG. 7 is a cross-sectional view showing the outer shrouds 60A and 60B shown in FIG. 3, which is taken along line F7-F7. The outer shroud 60A includes a first cooling path 81 and a second cooling path 82. The first cooling path 81 and the second cooling path 82 are paths into which a portion of cooling air supplied to the cavity CA of the outer shroud 60A flows and from which the cooling air flowing thereinto is discharged to the outside of the outer shroud 60A. The cooling of the outer shroud 60A is accelerated when the cooling air flows through the first cooling path 81 and the second cooling path 82.

In the present embodiment, the first cooling path 81 includes a first portion 81*a*, a second portion 81*b*, a third portion 81*c*, and a fourth portion 81*d*. The first portion 81*a* is provided in the front wall 65*f* and opens into the cavity CA from the axial upstream side Dau. A portion of the first portion 81*a* extends in the circumferential direction Dc. The second portion 81*b* is connected to the first portion 81*a*. The second portion 81*b* is provided in the suction-side wall 65*n* and extends along the suction-side end portion EnA of the outer shroud 60A. The third portion 81*c* is connected to the second portion 81*b*. The third portion 81*c* is provided in the rear wall 65*b* and extends in the circumferential direction Dc. The fourth portion 81*d* is connected to the third portion 81*c*. The fourth portion 81*d* is connected to a first discharge port 91 provided in the rear wall 65*b* and communicates with the outside of the outer shroud 60A through the first discharge port 91.

Meanwhile, the second cooling path 82 includes a first portion 82*a*, a second portion 82*b*, a third portion 82*c*, and a fourth portion 82*d*. The first portion 82*a* is provided in the front wall 65*f* and opens into the cavity CA from the axial upstream side Dau. A portion of the first portion 82*a* extends in the circumferential direction Dc. The second portion 82*b* is connected to the first portion 82*a*. The second portion 82*b* is provided in the pressure-side wall 65*p* and extends along the pressure-side end portion EpA of the outer shroud 60A. In the present embodiment, a width W2 of the second portion 82*b* of the second cooling path 82 in the circumferential direction Dc is equal to a width W1 of the second portion 81*b* of the first cooling path 81 in the circumferential direction Dc. The third portion 82*c* is connected to the second portion 82*b*. The third portion 82*c* is provided in the rear wall 65*b* and extends in the circumferential direction Dc. The fourth portion 82*d* is connected to the third portion 82*c*. The fourth portion 82*d* is connected to a second discharge port 92 provided in the rear wall 65*b* and communicates with the outside of the outer shroud 60A through the second discharge port 92.

Similarly, the outer shroud 60B includes a third cooling path 83 and a fourth cooling path 84. The third cooling path 83 and the fourth cooling path 84 are paths into which a portion of cooling air supplied to the cavity CA of the outer shroud 60B flows and from which the cooling air flowing thereinto is discharged to the outside of the outer shroud 60B. The cooling of the outer shroud 60B is accelerated when the cooling air flows through the third cooling path 83 and the fourth cooling path 84.

In the present embodiment, the third cooling path 83 includes a first portion 83*a*, a second portion 83*b*, a third portion 83*c*, and a fourth portion 83*d*. The first portion 83*a* is provided in the front wall 65*f* and opens into the cavity CA from the axial upstream side Dau. A portion of the first portion 83*a* extends in the circumferential direction Dc. The second portion 83*b* is connected to the first portion 83*a*. The second portion 83*b* is provided in the suction-side wall 65*n* and extends along the suction-side end portion EnB of the outer shroud 60B. The third portion 83*c* is connected to the second portion 83*b*. The third portion 83*c* is provided in the rear wall 65*b* and extends in the circumferential direction Dc. The fourth portion 83*d* is connected to the third portion 83*c*. The fourth portion 83*d* is connected to a third discharge port 93 provided in the rear wall 65*b* and communicates with the outside of the outer shroud 60B through the third discharge port 93.

Meanwhile, the fourth cooling path 84 includes a first portion 84*a*, a second portion 84*b*, a third portion 84*c*, and a fourth portion 84*d*. The first portion 84*a* is provided in the front wall 65*f* and opens into the cavity CA from the axial upstream side Dau. A portion of the first portion 84*a* extends in the circumferential direction Dc. The second portion 84*b* is connected to the first portion 84*a*. The second portion 84*b* is provided in the pressure-side wall 65*p* and extends along the pressure-side end portion EpB of the outer shroud 60B. In the present embodiment, a width W4 of the second portion 84*b* of the fourth cooling path 84 in the circumferential direction Dc is equal to a width W3 of the second portion 83*b* of the third cooling path 83 in the circumferential direction Dc. The third portion 84*c* is connected to the second portion 84*b*. The third portion 84*c* is provided in the rear wall 65*b* and extends in the circumferential direction Dc. The fourth portion 84*d* is connected to the third portion 84*c*. The fourth portion 84*d* is connected to a fourth discharge port 94 provided in the rear wall 65*b* and communicates with the outside of the outer shroud 60B through the second discharge port 92.

Figure 8:
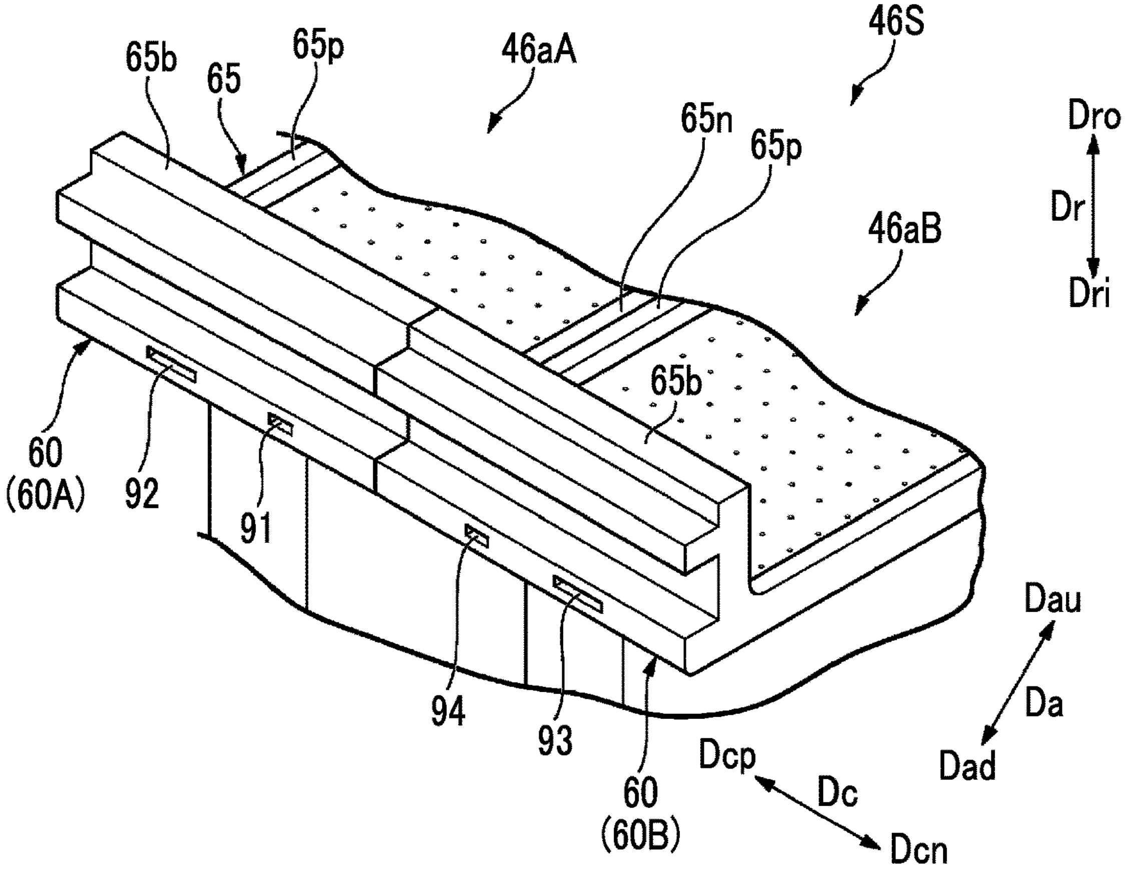
FIG. 8 is a perspective view showing the stator vane segment according to the embodiment of the present disclosure as seen from an obliquely rear side.

FIG. 8 is a perspective view showing the stator vane segment 46S of the embodiment as seen from an obliquely rear side. A rear end surface (an end surface that faces the axial downstream side Dad) of the outer shroud 60A includes the first discharge port 91 and the second discharge port 92. The first discharge port 91 is connected to the first cooling path 81 and cooling air flowing through the first cooling path 81 is discharged to the outside of the outer shroud 60A through the first discharge port 91. The second discharge port 92 is connected to the second cooling path 82 and cooling air flowing through the second cooling path 82 is discharged to the outside of the outer shroud 60A through the second discharge port 92.

In the present embodiment, the opening area of the second discharge port 92 is larger than the opening area of the first discharge port 91. For example, the opening area of the second discharge port 92 is equal to or larger than two times the opening area of the first discharge port 91. Therefore, in the present embodiment, an air-flow resistance relating to the second cooling path 82 is smaller than an air-flow resistance relating to the first cooling path 81. As a result, the flow rate of cooling air flowing through the second cooling path 82 is larger than the flow rate of cooling air flowing through the first cooling path 81.

Similarly, a rear end surface of the outer shroud 60B includes the third discharge port 93 and the fourth discharge port 94. The third discharge port 93 is connected to the third cooling path 83 and cooling air flowing through the third cooling path 83 is discharged to the outside of the outer shroud 60B through the third discharge port 93. The fourth discharge port 94 is connected to the fourth cooling path 84 and cooling air flowing through the fourth cooling path 84 is discharged to the outside of the outer shroud 60B through the fourth discharge port 94.

In the present embodiment, the opening area of the third discharge port 93 is larger than the opening area of the fourth discharge port 94. For example, the opening area of the third discharge port 93 is equal to or larger than two times the opening area of the fourth discharge port 94. Therefore, in the present embodiment, an air-flow resistance relating to the third cooling path 83 is smaller than an air-flow resistance relating to the fourth cooling path 84. As a result, the flow rate of cooling air flowing through the third cooling path 83 is larger than the flow rate of cooling air flowing through the fourth cooling path 84.

(Method for Producing Stator Vane Segment)

Next, a method for producing the stator vane segment 46S will be described.

Figure 9:
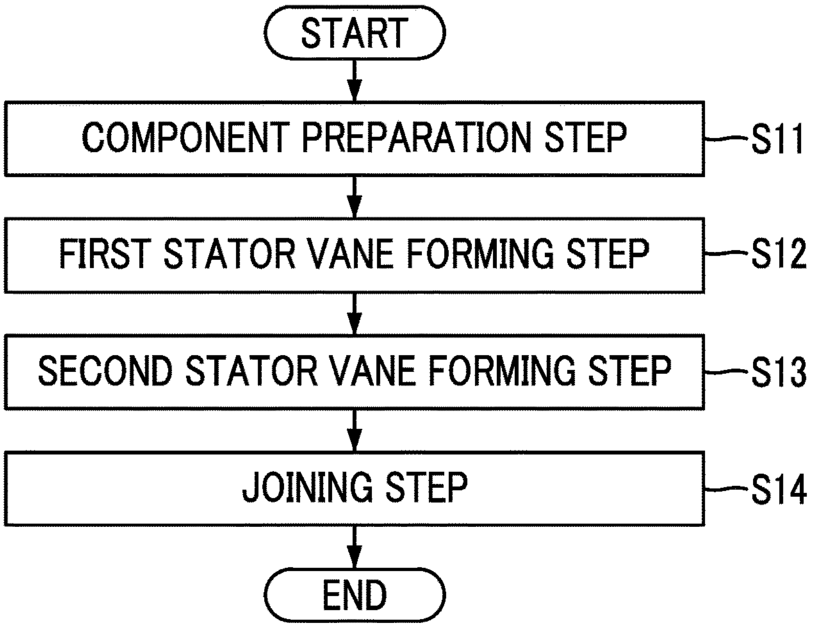
FIG. 9 is a flowchart showing the procedure for a method for producing the stator vane segment according to the embodiment of the present disclosure.
Figure 10:
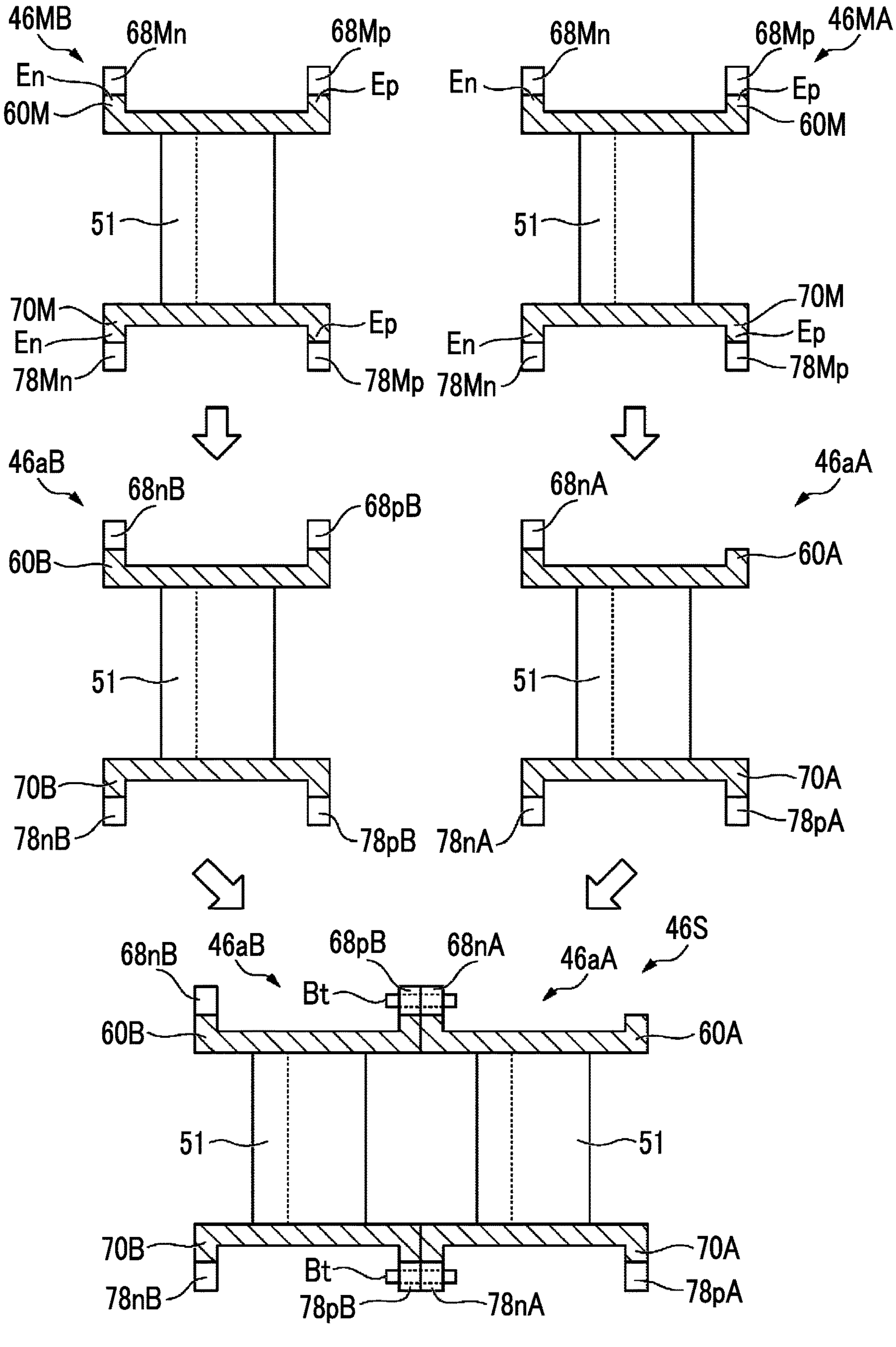
FIG. 10 is a cross-sectional view for description of the method for producing the stator vane segment according to the embodiment of the present disclosure.

FIG. 9 is a flowchart showing the procedure for the method for producing the stator vane segment 46S in the embodiment. FIG. 10 is a cross-sectional view for description of the method for producing the stator vane segment 46S. The producing method in the present embodiment can be applied not only to a case where the stator vane segment 46S is to be produced at the time of new installation of the gas turbine 10 but also to a case where the stator vane segment 46S is produced from a stator vane segment already installed at the time of maintenance or modification of a gas turbine already installed (a case where the stator vane segment already installed is modified into the stator vane segment 46S).

The producing method of the present embodiment includes, for example, a component preparation step (S11), a first stator vane forming step (S12), a second stator vane forming step (S13), and a joining step (S14). Which of the first stator vane forming step (S12) and the second stator vane forming step (S13) is performed first does not matter.

In the component preparation step (S11), a first stator vane component 46MA (refer to FIG. 10) from which the first stator vane 46*a*A is formed and a second stator vane component 46MB (refer to FIG. 10) from which the second stator vane 46*a*B is formed are prepared. The first stator vane component 46MA and the second stator vane component 46MB have, for example, exactly the same shape. Each of the first stator vane component 46MA and the second stator vane component 46MB has the vane body 51, an outer shroud 60M, and an inner shroud 70M. The outer shroud 60M includes a suction-side flange 68Mn provided at a suction-side end portion En of the outer shroud 60M and a pressure-side flange 68Mp provided at a pressure-side end portion Ep of the outer shroud 60M. The suction-side flange 68Mn and the pressure-side flange 68Mp protrude toward the radial outer side Dco. Meanwhile, the inner shroud 70M includes a suction-side flange 78Mn provided at the suction-side end portion En of the inner shroud 70M and a pressure-side flange 78Mp provided at the pressure-side end portion Ep of the inner shroud 70M. The suction-side flange 78Mn and the pressure-side flange 78Mp protrude toward the radial outer side Dci.

When the gas turbine 10 is newly installed, the first stator vane component 46MA and the second stator vane component 46MB are molded by using the same mold (a common mold). Meanwhile, at the time of maintenance or modification of a gas turbine already installed, a set of stator vanes constituting a stator vane segment used in the already installed gas turbine corresponds to the first stator vane component 46MA and the second stator vane component 46MB.

In the first stator vane forming step (S12), the first stator vane 46*a*A is formed from the first stator vane component 46MA. Specifically, the pressure-side flange 68Mp is removed without removal of the suction-side flange 68Mn, the suction-side flange 78Mn, and the pressure-side flange 78Mp of the first stator vane component 46MA. For example, the pressure-side flange 68Mp is removed by being cut through electric discharge processing or the like. Next, necessary processing and predetermined finishing processing (coating processing and the like) are performed on the first stator vane component 46MA. Accordingly, the suction-side flange 68Mn, the suction-side flange 78Mn, and the pressure-side flange 78Mp respectively become the suction-side flange 68*n*A, the suction-side flange 78*n*A, and the pressure-side flange 78*p*A, so that the first stator vane 46*a*A is formed from the first stator vane component 46MA.

In the second stator vane forming step (S13), the second stator vane 46*a*B is formed from the second stator vane component 46MB. Specifically, necessary processing and predetermined finishing processing (coating processing and the like) are performed on the second stator vane component 46MB without removal of the suction-side flange 68Mn, the pressure-side flange 68Mp, the suction-side flange 78Mn, and the pressure-side flange 78Mp of the second stator vane component 46MB. Accordingly, the suction-side flange 68Mn, the pressure-side flange 68Mp, the suction-side flange 78Mn, and the pressure-side flange 78Mp respectively become the suction-side flange 68*n*B, the pressure-side flange 68*p*B, the suction-side flange 78*n*B, and the pressure-side flange 78*p*B, so that the second stator vane 46*a*B is formed from the second stator vane component 46MB.

In the joining step (S14), the suction-side flange 68*n*A of the first stator vane 46*a*A and the pressure-side flange 68*p*B of the second stator vane 46*a*B are joined to each other by the joining tools Bt. As a result, the stator vane segment 46S is completed.

(Operation and Effect)

As a comparative example, a configuration in which flanges are respectively provided at suction-side end portions and pressure-side end portions of both of a first stator vane and a second stator vane will be described. The present inventors have found in research that a mold for producing the first stator vane and the second stator vane can be commonized in the case of such a configuration but a large thermal stress may act although depending on an environment in which a gas turbine is used or conditions under which the gas turbine is operated. For example, it has been found that when a large flange (a pressure-side flange) is present at a position on a pressure-side of a vane body of a shroud, there is a case where a force acting in the direction of extension caused by thermal expansion of the pressure-side flange and a binding force caused by a recessed shape of the pressure-side of the vane body act in a region between the vane body and the pressure-side flange, which results in a large thermal stress acting in the region between the vane body and the pressure-side flange. Note that the reason why flanges are respectively provided at suction-side end portions and pressure-side end portions of both of a first stator vane and a second stator vane after the vanes are completed or during production thereof may be a reason other than commonization of the mold.

Therefore, in the present embodiment, in a region (the specific region SR) that is aligned with the suction-side flange 68*n*A of the first stator vane 46*a*A in the circumferential direction Dc, the distance L1 between the surface S1, which is a surface farthest from the gas path surface 63A of the first stator vane 46*a*A among surfaces of the pressure-side end portion EpA of the shroud 60A of the first stator vane 46*a*A, and the gas path surface 63A is smaller than the distance L5 between the surface S2, which is a surface farthest from the gas path surface 63B of the second stator vane 46*a*B among surfaces of the suction-side flange 68*n*B of the second stator vane 46*a*B, and the gas path surface 63B. According to such a configuration, it is possible to reduce a probability that a force acting in the direction of extension caused by thermal expansion of a pressure-side flange acts in a region between a vane body and the pressure-side flange and to reduce thermal stress acting on the stator vane segment 46S. As a result, it is possible to improve the resistance of the stator vane segment 46S against low cycle fatigue and to extend the lifespan of the stator vane segment 46S. Note that in a case where the second stator vane 46*a*B includes the suction-side flange 68*n*B, it is possible to reduce processing load after the molding of the first stator vane 46*a*A and the second stator vane 46*a*B performed by using the same mold and to achieve improvement in producibility due to commonization of the mold, for example. However, the reason why the second stator vane 46*a*B includes the suction-side flange 68*n*B is not limited to the commonization of the mold and may be another reason such as simplification of design and improvement of rigidity.

Modification Example

Next, a modification example of the present embodiment will be described. Note that the present modification example has the same configuration as that of the above-described embodiment except for configurations described below.

Figure 11:
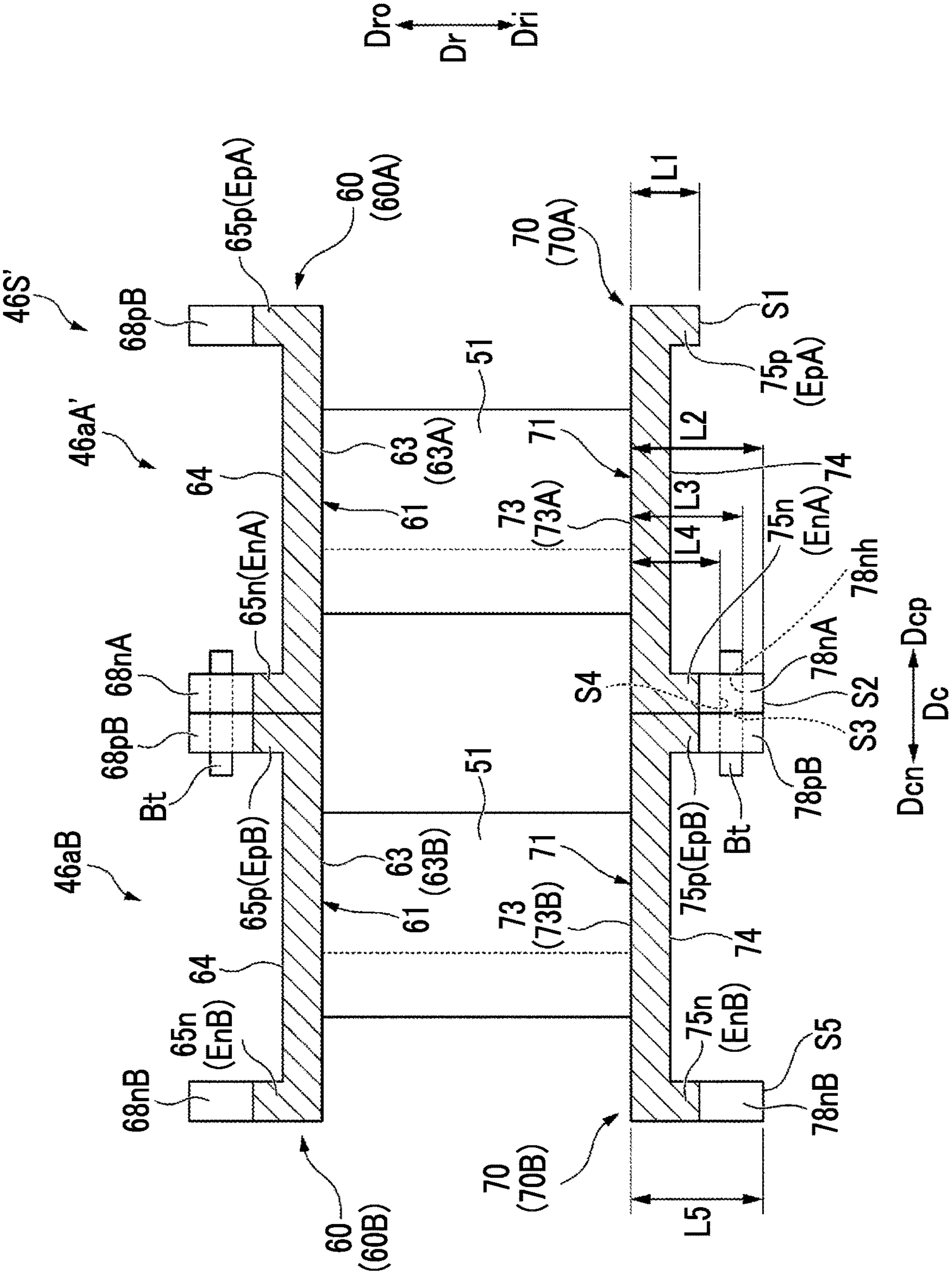
FIG. 11 is a cross-sectional view schematically showing a stator vane segment according to a modification example of the embodiment of the present disclosure.

FIG. 11 is a cross-sectional schematically view showing a stator vane segment 46S' of the modification example of the embodiment. In the present modification example, the suction-side end portion EnA of the inner shroud 70A is provided with the suction-side flange 78*n*A and the pressure-side end portion EpA of the inner shroud 70A is provided with no pressure-side flange.

That is, in the case of the inner shroud 70A of a first stator vane 46*a*A' in the present modification example, in a region that is aligned with the suction-side flange 78*n*A of the first stator vane 46*a*A' in the lateral direction Dc, the distance L1 between the surface S1, which is a surface farthest from the gas path surface 73A of the first stator vane 46*a*A' among surfaces of the pressure-side end portion EpA of the inner shroud 70A, and the gas path surface 73A is smaller than the distance L5 between the surface S5, which is a surface farthest from the gas path surface 73B of the second stator vane 46*a*B among surfaces of the suction-side flange 78*n*B of the second stator vane 46*a*B, and the gas path surface 73B. In the present modification example, the surface S1 is a portion of a lower surface (a surface that faces the radial inner side Dri) of the pressure-side wall 75*p*.

In the present modification example, the surface S1 is close to the gas path surface 73A in comparison with the surface S3, which is a surface farthest from the gas path surface 73A among inner peripheral surfaces of the insertion hole 78*nh* provided in the suction-side flange 78*n*A. That is, the distance L1 between the surface S1 and the gas path surface 73A is smaller than the distance L3 between the surface S3 and the gas path surface 73A. Furthermore, the surface S1 is close to the gas path surface 73A in comparison with the surface S4, which is a surface closest to the gas path surface 73A among the inner peripheral surfaces of the insertion hole 78*nh* provided in the suction-side flange 78*n*A. That is, the distance L1 between the surface S1 and the gas path surface 73A is smaller than the distance L4 between the surface S4 and the gas path surface 73A.

In other words, the suction-side flange 78*n*B of the second stator vane 46*a*B includes the surface S5, which is a surface farthest from the gas path surface 73B of the second stator vane 46*a*B among surfaces of the suction-side flange 78*n*B. In addition, the distance L1 between the surface S1 and the gas path surface 73A is smaller than the distance L5 between the surface S5 and the gas path surface 73B.

In the present modification example, the suction-side end portion EnA of the outer shroud 60A is provided with the suction-side flange 68*n*A and the pressure-side end portion EpA of the outer shroud 60A is provided with a pressure-side flange 68*p*A. The pressure-side flange 68*p*A and the suction-side flange 68*n*A have the same outer shape as each other.

According to such a configuration, thermal stress may be reduced as with the above-described embodiment. In the present modification example, the inner shroud 70A is an example of the "first shroud". The inner shroud main body 71 of the inner shroud 70A is an example of the "first shroud main body". The gas path surface 73 of the inner shroud 70A is an example of the "first gas path surface". The inner peripheral wall 75 of the inner shroud 70A is an example of the "first peripheral wall". The inner shroud 70B is an example of the "second shroud". The inner shroud main body 71 of the inner shroud 70B is an example of the "second shroud main body". The gas path surface 73 of the inner shroud 70B is an example of the "second gas path surface". The inner peripheral wall 75 of the inner shroud 70B is an example of the "second peripheral wall".

Other Embodiments

Hereinabove, the embodiments of the present disclosure have been described in detail with reference to the drawings. However, a specific configuration is not limited to the embodiments, and design changes can be made without departing from the gist of the present disclosure. For example, the first stator vane 46*a*A and the second stator vane 46*a*B may not be molded by using a common mold and may be molded by using different molds. For example, the pressure-side end portion EpA of the outer shroud 60A may be provided with a pressure-side protrusion portion smaller than the suction-side flange 68*n*B instead of being provided with no pressure-side flange as in the above-described embodiment. In a case where the pressure-side protrusion portion is small, a force caused by thermal expansion is less likely to act in comparison with a case where a large pressure-side flange is provided and thus thermal stress can be reduced. In addition, the above-described embodiment and the modification example may be combined with each other. For example, a configuration in which the pressure-side end portion EpA of the outer shroud 60A is provided with no pressure-side protrusion portion and the pressure-side end portion EpA of the inner shroud 70A is provided with no pressure-side protrusion portion may also be adopted.

For example, relationships as follows are understood in the above-described embodiment and the modification example. The first stator vane 46*a*A is an example of a "first stator vane". The second stator vane 46*a*B is an example of a "second stator vane". The suction side is an example of a "first side". The pressure side is an example of a "second side". Each of the suction-side end portion EnA and the suction-side end portion EnB is an example of a "first end portion". Each of the pressure-side end portion EpA and the pressure-side end portion EpB is an example of a "second end portion". The suction-side flange 68*n*A is an example of each of a "first suction-side protrusion portion", a "first protrusion portion", and a "protrusion portion of the first end portion of the first stator vane". The suction-side flange 68*n*B is an example of each of a "second suction-side protrusion portion", a "second protrusion portion", and a "protrusion portion of the first end portion of the second stator vane". The pressure-side flange 68*p*B is an example of each of a "pressure-side protrusion portion", a "third protrusion portion", and a "protrusion portion of the second end portion of the second stator vane". The suction-side wall 65*n* is an example of a "first side wall". The pressure-side wall 65*p* is an example of a "second side wall".

Here, in the above-described embodiment and the modification example, an example in which a pressure-side flange of the first stator vane 46*a*A, which is a pressure-side vane, is removed has been described. However, the embodiment and the modification example are not limited to the above-described example. For example, there is a case where suction-side stress is large although depending on design or operating conditions. In such a case, a suction-side flange of the second stator vane 46*a*B, which is a suction-side vane, may be removed without removal of the pressure-side flange of the first stator vane 46*a*A, which is the pressure-side vane. In this aspect, for example, relationships as follows are understood. The second stator vane 46*a*B from which the suction-side flange 68*n*B has been removed is an example of a "first stator vane". The first stator vane 46*a*A from which the pressure-side flange 68*p*A has not been removed is an example of a "second stator vane". The pressure side is an example of the "first side". The suction side is an example of the "second side". Each of the pressure-side end portion EpA and the pressure-side end portion EpB is an example of the "first end portion". Each of the suction-side end portion EnA and the suction-side end portion EnB is an example of the "second end portion". The pressure-side flange 68*p*B of the second stator vane 46*a*B is an example of each of a "first pressure-side protrusion portion", the "first protrusion portion", and a "protrusion portion of the first end portion of the first stator vane". The pressure-side flange 68*p*A not removed from the first stator vane 46*a*A is an example of each of a "second pressure-side protrusion portion", the "second protrusion portion", and a "protrusion portion of the first end portion of the second stator vane". The suction-side flange 68*n*A of the first stator vane 46*a*A is an example of each of a "suction-side protrusion portion", the "third protrusion portion", and a "protrusion portion of the second end portion of the second stator vane". The pressure-side wall 65*p* is an example of the "first side wall". The suction-side wall 65*n* is an example of the "second side wall". In addition, as in the modification example shown in FIG. 11, regarding the inner shroud, a suction-side flange of the second stator vane 46*a*B, which is the suction-side vane, may be removed without removal of a pressure-side flange of the first stator vane 46*a*A, which is the pressure-side vane.

APPENDIX

The stator vane segments 46S and 46S', the gas turbine 10, and a method for producing the stator vane segments 46S and 46S' described in the embodiment are understood as follows, for example.

(1) Each of the stator vane segments 46S and 46S' according to a first aspect includes a first stator vane (for example, the first stator vane 46*a*A), a second stator vane (for example, the second stator vane 46*a*B) aligned with the first stator vane, and the joining tool Bt that joins the first stator vane and the second stator vane to each other. The second stator vane is positioned, with respect to the first stator vane, on a first side among the first side and a second side in the lateral direction Dc in which the first stator vane and the second stator vane are arranged. Each of the first stator vane and the second stator vane includes the vane body 51 that is disposed in the combustion gas flow path 49 and the shrouds 60 and 70 that are provided at ends of the vane body 51 in a vane height direction. Each of the first shrouds (for example, the shrouds 60A and 70A), which are the shrouds 60 and 70 of the first stator vane, includes a first gas path surface (for example, the gas path surfaces 63A and 73A) that faces the combustion gas flow path 49 and a first protrusion portion (for example, the suction-side flanges 68*n*A and 78*n*A) that protrudes toward a counter-flow path side, which is a side opposite to the combustion gas flow path 49, and that is positioned at a first end portion of the first shroud which is an end portion on the first side. Each of the second shrouds (for example, the shrouds 60B and 70B), which are the shrouds 60 and 70 of the second stator vane, includes a second gas path surface (for example, the gas path surfaces 63B and 73B) that faces the combustion gas flow path 49, a second protrusion portion (for example, the suction-side flanges 68*n*B and 78*n*B) that protrudes toward the counter-flow path side and that is provided at a first end portion of the second shroud which is an end portion on the first side, and a third protrusion portion (for example, the pressure-side flanges 68*p*B and 78*p*B) that protrudes toward the counter-flow path side and that is provided at a second end portion of the second shroud which is an end portion on the second side, the third protrusion portion being joined to the first protrusion portion by the joining tool Bt. In the region SR aligned with the first protrusion portion in the lateral direction Dc, the distance L1 between the surface S1, which is a surface farthest from the first gas path surface among surfaces of a second end portion of the first shroud which is an end portion on the second side, and the first gas path surface is smaller than the distance L5 between the surface S5, which is a surface farthest from the second gas path surface among surfaces of the second suction-side protrusion portion, and the second gas path surface.

According to such a configuration, it is possible to reduce a probability that a force acting in the direction of extension caused by thermal expansion of a protrusion portion present at the first shroud acts in a region between the vane body 51 and an end portion of the first shroud and to reduce thermal stress acting on the stator vane segments 46S and 46S'.

(2) The stator vane segments 46S and 46S' according to a second aspect are the stator vane segments 46S and 46S' according to (1), in which the first shroud includes a first shroud main body (for example, the shroud main bodies 61 and 71) that includes the first gas path surface and a first peripheral wall (for example, the peripheral walls 65 and 75) that is provided along a peripheral edge of the first shroud main body, that protrudes toward the counter-flow path side, and that forms the cavity CA into which cooling intake air flows. The second shroud includes a second shroud main body (for example, the shroud main bodies 61 and 71) that includes the second gas path surface and a second peripheral wall (for example, the peripheral walls 65 and 75) that is provided along a peripheral edge of the second shroud main body, that protrudes toward the counter-flow path side, and that forms the cavity CA into which cooling intake air flows. Each of the first peripheral wall and the second peripheral wall includes the front wall 65*f* that faces an upstream side which is a side from which a combustion gas flows in the combustion gas flow path 49, the rear wall 65*b* that faces a downstream side which is a side to which the combustion gas flows in the combustion gas flow path 49, a first side wall (for example, the suction-side wall 65*n*) that connects the front wall 65*f* and the rear wall 65*b* to each other on the first side with respect to the vane body 51, and a second side wall (for example, the pressure-side wall 65*p*) that connects the front wall 65*f* and the rear wall 65*b* to each other on the second side with respect to the vane body 51. The first protrusion portion protrudes toward the counter-flow path side from the first side wall of the first peripheral wall. The second protrusion portion protrudes toward the counter-flow path side from the first side wall of the second peripheral wall. The third protrusion portion may protrude toward the counter-flow path side from the second side wall of the second peripheral wall.

According to such a configuration, in a configuration in which a peripheral wall forming the cavity CA is provided, it is possible to reduce a probability that a force acting in the direction of extension caused by thermal expansion of a protrusion portion present at the first shroud acts in a region between the vane body 51 and an end portion of the first shroud and to reduce thermal stress acting on the stator vane segments 46S and 46S'.

(3) The stator vane segment 46S according to a third aspect is the stator vane segment 46S according to (1) or (2), in which the first protrusion portion and the second protrusion portion may have the same outer shape as each other.

According to such a configuration, for example, it is possible to reduce a load of processing the second protrusion portion after the first stator vane and the second stator vane are molded by using the same mold. As a result, the producibility of the stator vane segments 46S and 46S' can be improved. Note that an advantage achieved with the first protrusion portion and the second protrusion portion having the same outer shape as each other is not limited to commonization of the mold and may also correspond to another reason such as simplification of design and improvement of rigidity.

(4) The stator vane segment 46S according to a fourth aspect is the stator vane segment 46S according to any one of (1) to (3), in which the first protrusion portion includes a hole (for example, the insertion hole 68*nh*) through which the joining tool Bt is inserted. In the region SR aligned with the first protrusion portions in the lateral direction Dc, the surface S1, which is the surface farthest from the first gas path surface among surfaces of the second end portion of the first shroud, may be close to the first gas path surface in comparison with the surface S4, which is a surface closest to the first gas path surface among inner peripheral surfaces of the hole.

According to such a configuration, it is possible to further reduce a probability that a force acting in the direction of extension caused by thermal expansion of an end portion of the first shroud acts in a region between the vane body and an end portion of the first shroud and to further reduce thermal stress acting on the stator vane segment 46S.

(5) The stator vane segment 46S according to a fifth aspect is the stator vane segment 46S according to any one of (1) to (4), in which the first shroud and the second shroud are the outer shrouds 60 that are positioned on an outer peripheral side of the stator vane segment 46S in the vane height direction. The first protrusion portion, the second protrusion portion, and the third protrusion portion may protrude toward the outer peripheral side.

According to such a configuration, it is possible to reduce thermal stress acting on the stator vane segment 46S in a case where large thermal stress is likely to act on the outer shrouds 60. The meaning of the case where large thermal stress is likely to act on the outer shrouds 60 is, for example, a case where a large amount of cooling air is supplied to the outer shrouds 60 from the radial outer side Dro to accelerate the cooling of the vane body 51, the temperature of the outer shrouds 60 is made relatively low near the vane body 51, and thus thermal gradient in a region between the vane body 51 and an end portion of the first shroud becomes high, which results in a high probability of large thermal stress acting on the stator vane segment. However, the case where large thermal stress is likely to act on the outer shrouds 60 is not limited to the above-described example.

(6) The stator vane segment 46S according to a sixth aspect is the stator vane segment 46S' according to any one of (1) to (4), in which the first shroud and the second shroud are the inner shrouds 70 that are positioned on an inner peripheral side of the stator vane segment 46S' in the vane height direction. The first protrusion portion, the second protrusion portion, and the third protrusion portion may protrude toward the inner peripheral side.

According to such a configuration, it is possible to reduce thermal stress acting on the stator vane segment 46S' in a case where large thermal stress is likely to act on the inner shrouds 70. The meaning of the case where large thermal stress is likely to act on the inner shrouds 70 is, for example, a case where a large increase in temperature occurs while air that passes through the vane body 51 and is used to cool the inner shrouds 70 is passing through the vane body 51, and thus the temperature of the inner shrouds 70 is made high, which results in a high probability of large thermal stress acting on the stator vane segment 46S'. However, the case where large thermal stress is likely to act on the inner shrouds 70 is not limited to the above-described example.

(7) The stator vane segments 46S and 46S' according to a seventh aspect are the stator vane segment 46S according to any one of (1) to (6), in which the first shroud includes the first cooling path 81 that includes a portion extending along the first end portion (for example, the suction-side end portion EnA) of the first shroud and through which cooling air flows and the second cooling path 82 that includes a portion extending along the second end portion (for example, the pressure-side end portion EpA) of the first shroud and through which the cooling air flows. The second shroud includes the third cooling path 83 that includes a portion extending along the first end portion (for example, the suction-side end portion EnB) of the second shroud and through which the cooling air flows and the fourth cooling path 84 that includes a portion extending along the second end portion (for example, the pressure-side end portion EpB) of the second shroud and through which the cooling air flows. The flow rate of the cooling air flowing through the second cooling path 82 is larger than the flow rate of the cooling air flowing through the first cooling path 81. The flow rate of the cooling air flowing through the third cooling path 83 may be larger than the flow rate of the cooling air flowing through the fourth cooling path 84.

Here, each the stator vane segments 46S and 46S' is not joined to other stator vane segments 46S and 46S' adjacent to the stator vane segments 46S and 46S' in the circumferential direction Dc in the gas turbine 10. For this reason, there may be a small gap between the stator vane segments 46S and 46S' adjacent to each other in the lateral direction Dc and a high-temperature combustion gas may enter the gap from the combustion gas pass 49. As a result, the temperature of both end portions (for example, the second end portion of the first shroud and the first end portion of the second shroud) of the stator vane segments 46S and 46S' in the lateral direction Dc may be made high. However, according to the configuration of the seventh aspect, the cooling of both end portions of the stator vane segments 46S and 46S' in the lateral direction Dc which are likely to be made high in temperature can be accelerated by the cooling air flowing through the second cooling path 82 and the third cooling path 83. Accordingly, it is possible to further reduce thermal stress acting on the stator vane segments 46S and 46S'.

(8) The stator vane segment 46S according to an eighth aspect is the stator vane segments 46S and 46S' according to (7), in which the first shroud includes the first discharge port 91 through which the cooling air flowing through the first cooling path 81 is discharged to the outside of the first shroud and the second discharge port 92 through which the cooling air flowing through the second cooling path 82 is discharged to the outside of the first shroud. The second shroud includes the third discharge port 93 through which the cooling air flowing through the third cooling path 83 is discharged to the outside of the second shroud and the fourth discharge port 94 through which the cooling air flowing through the fourth cooling path 84 is discharged to the outside of the second shroud. The opening area of the second discharge port 92 is larger than the opening area of the first discharge port 91. The opening area of the third discharge port 93 may be larger than the opening area of the fourth discharge port 94.

According to such a configuration, it is possible to increase the flow rate of the cooling air flowing through the second cooling path 82 and the third cooling path 83 while avoiding an increase in width of the shrouds in the lateral direction Dc, for example. Accordingly, the cooling of both end portions of the stator vane segments 46S and 46S' in the lateral direction Dc can be accelerated and thermal stress acting on the stator vane segments 46S and 46S' can be reduced.

(9) The gas turbine 10 according to a ninth aspect includes the stator vane segments 46S and 46S' according to any one of (1) to (8), a rotor (the turbine rotor 41) that is rotatable around the axis Ar, a casing (the gas turbine casing 15) that covers an outer peripheral side of the rotor, and the combustor 30 that generates a combustion gas through combustion of fuel and that sends the combustion gas into the casing. The stator vane segments 46S and 46S' are provided on an inner peripheral side of the casing. According to such a configuration, thermal stress acting on the gas turbine 10 can be suppressed.

(10) A method for producing the stator vane segments 46S and 46S' according to a tenth aspect is a method for producing a stator vane segment in which a first stator vane (for example, the first stator vane 46*a*A) and a second stator vane (for example, the second stator vane 46*a*B) are joined to each other by the joining tool Bt and the second stator vane is positioned, with respect to the first stator vane, on a first side among the first side and a second side in the lateral direction Dc in which the first stator vane and the second stator vane are arranged, the method including preparing the first stator vane component 46MA and the second stator vane component 46MB each of which includes the vane body 51 that is disposed in the combustion gas flow path 49 and that has an airfoil shape and the shrouds 60 and 70 that are provided at ends of the vane body 51 in a vane height direction, the shrouds 60 and 70 including the gas path surfaces 63 and 73 that face the combustion gas flow path 49, a protrusion portion (for example, the suction-side flange 68Mn) that is positioned at a first end portion (for example, the suction-side end portions EnA and EnB) of the shrouds 60 and 70 and that protrudes toward a counter-flow path side which is a side opposite to the combustion gas flow path 49 and a protrusion portion (for example, the pressure-side flange 68Mp) that is provided at a second end portion (for example, the pressure-side end portions EpA and EpB) of the shrouds 60 and 70 and that protrudes toward the counter-flow path side. The first stator vane 46*a*A is formed from the first stator vane component 46MA by removing at least a portion of the protrusion portion (for example, the pressure-side flange 68Mp) of the second end portion of the first stator vane component 46MA, the second stator vane 46*a*B is formed from the second stator vane component 46MB without removal of the protrusion portion (for example, the suction-side flange 68Mn) of the first end portion of the second stator vane component 46MB, and the protrusion portion of the first end portion of the first stator vane 46*a*A and the protrusion portion of the second end portion of the second stator vane 46*a*B are joined to each other by the joining tool Bt. According to such a configuration, thermal stress acting on the stator vane segments 46S and 46S' can be suppressed.

INDUSTRIAL APPLICABILITY

According to a stator vane segment, a gas turbine, and a method for producing a stator vane segment of the present disclosure, it is possible to reduce thermal stress.

REFERENCE SIGNS LIST

10: gas turbine
11: gas turbine rotor
15: gas turbine casing
20: compressor
30: combustor
41: turbine rotor
45: turbine casing
46S, 46S': stator vane segment
46*a*A, 46*a*A': first stator vane
46*a*B: second stator vane
51: vane body
60: outer shroud
61: outer shroud main body
63: gas path surface
65: outer peripheral wall
65*f*: front wall
65*b*: rear wall
65*n*: suction-side wall
65*p*: pressure-side wall
68*n*A, 68*n*B: suction-side flange
68*p*A, 68*p*B: pressure-side flange
70: inner shroud
71: inner shroud main body
73: gas path surface
75: inner peripheral wall
75*f*: front wall
75*b*: rear wall

75*n*: suction-side wall
75*p*: pressure-side wall
78*n*A, 78*n*B: suction-side flange
78*p*A, 78*p*B: pressure-side flange
81: first cooling path
82: second cooling path
83: third cooling path
84: fourth cooling path
91: first discharge port
92: second discharge port
93: third discharge port
94: fourth discharge port
Bt: joining tool
CA: cavity
EnA: suction-side end portion of shroud of first stator vane
EpA: pressure-side end portion of shroud of first stator vane
EnB: suction-side end portion of shroud of second stator vane
EpB: pressure-side end portion of shroud of second stator vane
MA: first stator vane component
MB: second stator vane component

The invention claimed is:

1. A method for producing a stator vane segment in which a first stator vane and a second stator vane are joined to each other by a joining tool and the second stator vane is positioned, with respect to the first stator vane, on a first side among the first side and a second side in a lateral direction in which the first stator vane and the second stator vane are arranged, the method comprising:

preparing a first stator vane component and a second stator vane component each of which includes a vane body that is disposed in a combustion gas flow path and that has an airfoil shape and a shroud that is provided at an end of the vane body in a vane height direction, the shroud including a gas path surface that faces the combustion gas flow path, a protrusion portion that is positioned at a first end portion of the shroud which is an end portion on the first side and that protrudes toward a counter-flow path side which is a side opposite to the combustion gas flow path, and a protrusion portion that is positioned at a second end portion of the shroud which is an end portion on the second side and that protrudes toward the counter-flow path side;

forming the first stator vane from the first stator vane component by removing at least a portion of the protrusion portion of the second end portion of the first stator vane component;

forming the second stator vane from the second stator vane component without removal of the protrusion portion of the first end portion of the second stator vane component; and joining the protrusion portion of the first end portion of the first stator vane and the protrusion portion of the second end portion of the second stator vane to each other using the joining tool.

2. A stator vane segment comprising:

a first stator vane;

a second stator vane aligned with the first stator vane; and a joining tool that joins the first stator vane and the second stator vane to each other, wherein the second stator vane is positioned, with respect to the first stator vane, on a first side among the first side and a second side in a lateral direction in which the first stator vane and the second stator vane are arranged, each of the first stator vane and the second stator vane includes a vane body that is disposed in a combustion gas flow path and that has an airfoil shape, and a shroud that is provided at an end of the vane body in a vane height direction, a first shroud, which is the shroud of the first stator vane, includes a first gas path surface that faces the combustion gas flow path, and a first protrusion portion that protrudes toward a counter-flow path side, which is a side opposite to the combustion gas flow path, and that is positioned at a first end portion of the first shroud which is an end portion on the first side, a second shroud, which is the shroud of the second stator vane, includes a second gas path surface that faces the combustion gas flow path, a second protrusion portion that protrudes toward the counter-flow path side and that is positioned at a first end portion of the second shroud which is an end portion on the first side, and a third protrusion portion that protrudes toward the counter-flow path side and that is positioned at a second end portion of the second shroud which is an end portion on the second side, the third protrusion portion being joined to the first protrusion portion by the joining tool, and in a region aligned with the first protrusion portion in the lateral direction, a distance between a surface farthest from the first gas path surface among surfaces of a second end portion of the first shroud which is an end portion on the second side and the first gas path surface is smaller than a distance between a surface farthest from the second gas path surface among surfaces of the second protrusion portion and the second gas path surface.

3. The stator vane segment according to claim 2, wherein the first shroud includes a first shroud main body that includes the first gas path surface and a first peripheral wall that is provided along a peripheral edge of the first shroud main body, that protrudes toward the counter-flow path side, and that forms a cavity into which cooling air flows, the second shroud includes a second shroud main body that includes the second gas path surface and a second peripheral wall that is provided along a peripheral edge of the second shroud main body, that protrudes toward the counter-flow path side, and that forms a cavity into which cooling air flows, each of the first peripheral wall and the second peripheral wall includes a front wall that faces an upstream side which is a side from which a combustion gas flows in the combustion gas flow path, a rear wall that faces a downstream side which is a side to which the combustion gas flows in the combustion gas flow path, a first side wall that connects the front wall and the rear wall to each other on the first side with respect to the vane body, and a second side wall that connects the front wall and the rear wall to each other on the second side with respect to the vane body, the first protrusion portion protrudes toward the counter-flow path side from the first side wall of the first peripheral wall, the second protrusion portion protrudes toward the counter-flow path side from the first side wall of the second peripheral wall, and the third protrusion portion protrudes toward the counter-flow path side from the second side wall of the second peripheral wall.

4. The stator vane segment according to claim 2, wherein the first protrusion portion and the second protrusion portion have the same outer shape as each other.

5. The stator vane segment according to claim 2, wherein the first protrusion portion includes a hole through which the joining tool is inserted, and in the region aligned with the first protrusion portion in the lateral direction, the surface farthest from the first gas path surface among the surfaces of the second end portion of the first shroud is closer to the first gas path surface than a surface closest to the first gas path surface among inner peripheral surfaces of the hole.

6. The stator vane segment according to claim 2, wherein the first shroud and the second shroud are outer shrouds that are positioned on an outer peripheral side of the stator vane segment in the vane height direction and the first protrusion portion, the second protrusion portion, and the third protrusion portion protrude toward the outer peripheral side.

7. The stator vane segment according to claim 2, wherein the first shroud and the second shroud are inner shrouds that are positioned on an inner peripheral side of the stator vane segment in the vane height direction and the first protrusion portion, the second protrusion portion, and the third protrusion portion protrude toward the inner peripheral side.

8. The stator vane segment according to claim 2, wherein the first shroud includes a first cooling path that includes a portion extending along the first end portion of the first shroud and through which cooling air flows, and a second cooling path that includes a portion extending along the second end portion of the first shroud and through which the cooling air flows, the second shroud includes a third cooling path that includes a portion extending along the first end portion of the second shroud and through which the cooling air flows, and a fourth cooling path that includes a portion extending along the second end portion of the second shroud and through which the cooling air flows, a flow rate of the cooling air flowing through the second cooling path is larger than a flow rate of the cooling air flowing through the first cooling path, and a flow rate of the cooling air flowing through the third cooling path is larger than a flow rate of the cooling air flowing through the fourth cooling path.

9. The stator vane segment according to claim 8, wherein the first shroud includes a first discharge port through which the cooling air flowing through the first cooling path is discharged to an outside of the first shroud, and a second discharge port through which the cooling air flowing through the second cooling path is discharged to the outside of the first shroud, the second shroud includes a third discharge port through which the cooling air flowing through the third cooling path is discharged to an outside of the second shroud, and a fourth discharge port through which the cooling air flowing through the fourth cooling path is discharged to the outside of the second shroud, an opening area of the second discharge port is larger than an opening area of the first discharge port, and an opening area of the third discharge port is larger than an opening area of the fourth discharge port.

10. A gas turbine comprising:

the stator vane segment according to claim 2;

a rotor that is rotatable around an axis;

a casing that covers an outer peripheral side of the rotor; and a combustor that generates a combustion gas through combustion of fuel and that sends the combustion gas into the casing, wherein the stator vane segment is provided on an inner peripheral side of the casing.

* * * * *